US012435003B2

(12) United States Patent
Obern

(10) Patent No.: US 12,435,003 B2
(45) Date of Patent: Oct. 7, 2025

(54) CEMENT ADDITIVE

(71) Applicant: AVERTANA LIMITED, Auckland (NZ)

(72) Inventor: James Kevin Obern, Parnell (NZ)

(73) Assignee: AVERTANA LIMITED, Auckland (NZ)

( * ) Notice: Subject to any disclaimer, the term of this patent is extended or adjusted under 35 U.S.C. 154(b) by 436 days.

(21) Appl. No.: 17/787,333

(22) PCT Filed: Dec. 16, 2020

(86) PCT No.: PCT/NZ2020/050175
§ 371 (c)(1),
(2) Date: Jun. 20, 2022

(87) PCT Pub. No.: WO2021/125979
PCT Pub. Date: Jun. 24, 2021

(65) Prior Publication Data
US 2023/0033308 A1 Feb. 2, 2023

(30) Foreign Application Priority Data
Dec. 19, 2019 (NZ) ........................... 760404

(51) Int. Cl.
| | | |
|---|---|---|
| *C04B 22/14* | (2006.01) | |
| *C04B 18/06* | (2006.01) | |
| *C04B 28/02* | (2006.01) | |
| *C04B 111/00* | (2006.01) | |

(52) U.S. Cl.
CPC .......... *C04B 22/143* (2013.01); *C04B 18/067* (2013.01); *C04B 28/02* (2013.01); *C04B 2111/00646* (2013.01); *C04B 2201/50* (2013.01)

(58) Field of Classification Search
CPC ..... C04B 22/143; C04B 18/064; C04B 28/02; C04B 2111/00646; C04B 2201/50; C04B 20/023; C04B 40/0042; C04B 7/48; C04B 11/28; C04B 2111/1018; C22B 7/04; Y02W 30/91; C01F 11/46
See application file for complete search history.

(56) References Cited

U.S. PATENT DOCUMENTS

| | | | |
|---|---|---|---|
| 4,006,080 A | 2/1977 | Twist et al. | |
| 4,562,049 A | 12/1985 | Shirts et al. | |
| 7,717,999 B1 | 5/2010 | Almusallam et al. | |
| 7,824,322 B2 | 11/2010 | Almusallam et al. | |
| 2015/0101510 A1* | 4/2015 | Tran | C04B 40/0039 106/735 |

FOREIGN PATENT DOCUMENTS

| | | | | |
|---|---|---|---|---|
| CN | 101979683 | | 2/2011 | |
| CN | 102115823 | | 7/2011 | |
| CN | 102381723 | | 3/2012 | |
| CN | 102701706 | | 10/2012 | |
| CN | 101988158 | | 11/2012 | |
| CN | 102815739 A | * | 12/2012 | ........... C01B 25/027 |
| CN | 102965515 | | 3/2013 | |
| CN | 106430264 | | 2/2017 | |
| CN | 106564945 | | 4/2017 | |
| CN | 106830037 | | 6/2017 | |
| CN | 107354252 A | * | 11/2017 | ......... C22B 34/1213 |
| CN | 108298562 | | 7/2018 | |
| CN | 109020269 | | 12/2018 | |
| EP | 3100990 A1 | * | 12/2016 | ............. C04B 14/06 |
| IN | 744/KOL/2014 | | 1/2016 | |
| JP | 2012193422 | | 10/2012 | |
| JP | 2012193422 A | * | 10/2012 | ............... C22B 7/04 |
| WO | 1998/051616 | | 11/1998 | |
| WO | 2016/007020 | | 1/2016 | |
| WO | 2016/007021 | | 1/2016 | |
| WO | 2016/007022 | | 1/2016 | |
| WO | 2017/123102 | | 7/2017 | |
| WO | 2020/122740 | | 6/2020 | |

OTHER PUBLICATIONS

CN_102815739_Machine_Translation (Year: 2012).*
JP_2012193422_Machine_Translation (Year: 2012).*
CN_107354252_Machine_Translation (Year: 2017).*
Ashrit et al, "Characterization of gypsum synthesized from LD slag fines generated at a waste recycling plant of a steel plant", New J Chem (2015), 39, 4128, Accepted: Mar. 18, 2015 (Mar. 18, 2015).
Beretka et al, "Energy-Saving Cements Obtained from Chemical Gypsum and Other Industrial Wastes", Waste Management vol. 16, Nos. 1-3, pp. 231-235 (1996).
Katsioti et al, "Use of jarosite/alunite precipitate as a substitute for gypsum in Portland cement", Cement & Concrete Composites 27 (2005), Accepted: Oct. 31, 2003.
Trees et al, "Neutralization of sulfate process titanium dioxide wastes with limestone and lime", Journal WPCF, vol. 51, No. 1, pp. 158-162, Jan. 1979.

* cited by examiner

*Primary Examiner* — Anthony J Green
*Assistant Examiner* — Anastasia A. Kuvayskaya
(74) *Attorney, Agent, or Firm* — JMB Davis Ben-David

(57) ABSTRACT

The invention provides cement additives comprising calcium sulfate and silica which are derived from a material comprising perovskite and silica, along with cements and cementitious products comprising the cement additives. The invention also provides methods for the making the cement additive and cements and cementitious products comprising the cement additives.

14 Claims, No Drawings

CEMENT ADDITIVE

CROSS-REFERENCE TO RELATED APPLICATIONS

This is the U.S. National Stage of International Patent Application No. PCT/NZ2020/050175 filed on Dec. 16, 2020, which in turn claims the benefit of New Zealand Patent Application No. 760404 filed on Dec. 19, 2019.

FIELD OF INVENTION

The invention relates to a cement additive, in particular a cement additive derived from a material comprising perovskite and silica, as well as cementitious products comprising the cement additive, and methods of making the cement additive and cementitious products comprising it.

BACKGROUND

The manufacture of cements involves sintering limestone and aluminosilicate materials such as clay, shale, sand, iron ore, bauxite, fly ash and slag in a kiln to form solid clinker which comprises alite ($3CaO \cdot SiO2$), belite ($2CaO \cdot SiO2$), tricalcium aluminate ($3CaO \cdot Al2O3$) and brownmillerite ($4CaO \cdot Al2O3 \cdot Fe2O3$), for example. The clinker is then typically ground in combination with gypsum ($CaSO4$) to form cement. The gypsum is primarily used as an additive to control the set time and prevent flash setting of the cement in use.

Clinker is the primary raw material in cement manufacturing and is the single largest cost contributor for a cement works. In addition, the process for making clinker is highly energy intensive and results in significant CO2 emissions.

Natural gypsum has traditionally been used for cement manufacture. Gypsum mines are reported to cause significant environmental damage and health risks for those working and living in the vicinity of the mines.

Methods for the production and recovery of titanium dioxide from industrial materials and ores produce large amounts of solid and/or liquid waste which must be disposed of at a cost and/or have a significant impact on the environment. It would be useful if the waste materials could be reduced, recycled or utilised in other processes to add value.

OBJECT

It is an object of the present invention to provide an improved cement and/or cement additive and/or related cementitious products and/or methods, or to at least provide the public with a useful choice.

SUMMARY OF THE INVENTION

In a first aspect, the invention provides a cement additive derived from a material comprising perovskite and silica, wherein the cement additive comprises calcium sulfate and silica.

In one embodiment, the cement additive comprises a composition (A) obtained from a material comprising perovskite and silica, wherein the composition (A) comprises calcium sulfate and silica.

In one embodiment, the composition (A) is obtained from a method of recovering one or more metal from a material comprising perovskite and silica, wherein the one or more metal is chosen from at least one of titanium, magnesium, aluminium and iron.

In one embodiment, the cement additive is derived from the material comprising perovskite and silica by a method comprising at least the steps of sulphating the material comprising perovskite and silica to form sulfated material. In one embodiment, the method further comprises separating a composition comprising calcium sulfate and silica from one or more other components contained in the sulfate material. In one embodiment, the cement additive is derived from the material comprising perovskite and silica by sulphating the material comprising perovskite and silica to form sulfated material and separating a composition comprising calcium sulfate and silica from one or more other components contained in the sulfated material to form the cement additive. In one embodiment, the composition comprising calcium sulfate and silica is washed following separation.

In one embodiment, the cement additive comprises composition (A) in combination with one or more additional materials. In one embodiment, the one or more additional materials comprises a composition (B) obtained in a process for the recovery of one or more metal from a material comprising perovskite and silica. In one embodiment, the one or more metal is titanium, magnesium, aluminium and/or iron. In one embodiment, composition (B) is a by-product of the process for the recovery of one or more metal from a material comprising perovskite and silica. In another embodiment, the one or more additional materials includes a feedstock used in a method for the recovering of one or more metal, or a derivative thereof. In an alternative embodiment, the cement additive consists or consists essentially of composition (A).

In a second aspect, the invention provides the use of a composition (A) obtained from a method of recovering one or more metal from a material comprising perovskite and silica as a cement additive, wherein the composition comprises calcium sulfate and silica, and wherein the one or more metal is chosen from at least one of titanium, magnesium, aluminium, iron.

In one embodiment, the method of recovering one or more metal comprises sulphating the material comprising perovskite and silica. In one embodiment, the method comprises sulphating the material comprising perovskite and silica to form sulfated material and separating a composition comprising calcium sulfate and silica from one or more other components contained in the sulfated material. In one embodiment, the composition comprising calcium sulfate and silica is washed following separation. In another embodiment, the method comprises combining the composition comprising calcium sulfate and silica with one or more other material.

In one embodiment of the first or second aspects, the one or more other components contained in the sulfated material is at least one or more sulfated metal salts. In one embodiment, the one or more sulfated metal salts are chosen from one or more sulfated titanium salts, one or more sulfated magnesium salts, and/or one or more sulfated aluminium salts.

In one embodiment of the first or second aspect, the material comprising perovskite and silica is an iron making slag. In another embodiment, the material comprising perovskite and silica is an ore or a natural perovskite concentrate. In a preferred embodiment, the material comprising perovskite and silica is a VTM slag. In another embodiment, the material comprising perovskite and silica is red mud (for example, derived from the Bayer alumina process).

In a third aspect, the invention provides a cement additive comprising calcium sulfate and silica. In one embodiment, the cement additive consists or consists essentially of a composition (A) as herein described. In another embodiment, the cement additive comprises a composition (A) as herein described in combination with one or more other material.

In one embodiment of any one of the first to third aspects, the cement additive comprises from approximately 40% to approximately 80% calcium sulfate (w/w). In another embodiment, it comprises from approximately 40% to approximately 75% calcium sulfate. In certain embodiments, the cement additive of the invention comprises from approximately 40%, from approximately 45%, from approximately 50%, from approximately 55%, from approximately 60%, from approximately 65%, from approximately 70% or approximately 75% calcium sulfate (CaSO4). In certain embodiments, the cement additive of the invention comprises from approximately 45% to approximately 70%, from approximately 50% to approximately 70%, from approximately 55% to approximately 70%, or from approximately 60% to approximately 70% calcium sulfate (w/w).

In one embodiment of any one of the first to third aspects, the cement additive comprises from approximately 10% to approximately 50% silica (w/w). In other embodiments, it comprises from approximately 10% to approximately 35% or from approximately 10% to approximately 30% silica. In certain embodiments, the cement additive comprises from approximately 10%, from approximately 15%, from approximately 20%, from approximately 25% or from approximately 30% silica. In certain embodiments, the cement additive comprises from approximately 15% to approximately 25% silica.

In one embodiment of any one of the first to third aspects, the cement additive comprises a ratio of silica to calcium sulfate from approximately 0.2 to approximately 1.2. In other embodiments, the ratio of silica to calcium sulfate in the cement additive is from approximately 0.2 to approximately 0.8, to approximately 0.7, to approximately 0.6 or to approximately 0.5.

In one embodiment of any one of the first the third aspects, the calcium sulfate comprises one or more of anhydrous, hemihydrate, or dihydrate calcium sulfate or any other form of calcium sulfate.

In one embodiment of any one of the first to the third aspects, the silica comprises one or more of silica in the form of amorphous silica and silica in the form of one or more metal silicates. In one embodiment, the silica is predominantly amorphous.

In one embodiment of any one of the first to third aspects, the cement additive further comprises one or more of aluminium oxide, titanium dioxide, magnesium oxide, iron oxide and calcium oxide. In another embodiment, the cement additive comprises all of aluminium oxide, titanium dioxide, magnesium oxide and iron oxide. In another embodiment, the cement additive comprises all of aluminium oxide, titanium dioxide, magnesium oxide, iron oxide and calcium oxide.

In one embodiment of any one of the first to third aspects, the cement additive comprises approximately 4% or less Iron oxide (w/w). In one embodiment, the cement additive comprises approximately 3% or less iron oxide, more preferably approximately 2% or less iron oxide or approximately 1% or less iron oxide.

In a fourth aspect, the invention provides the use of a material comprising perovskite and silica to obtain a cement additive comprising calcium sulfate and silica (for eg. of the first or third aspects).

In one embodiment of the fourth aspect, the material comprising perovskite and silica is sulfated to produce sulfated material and a composition comprising calcium sulfate and silica is recovered from the sulfated material by separating it from one or more other components contained in the sulfated material. In one embodiment, the composition comprising calcium sulfate and silica is washed following separation. In another embodiment, the composition comprising calcium sulfate and silica is combined with one or more other materials.

In a fifth aspect, the invention provides a method for the manufacture of a cement additive comprising calcium sulfate and silica (for eg. of the first or the third aspects), the method comprising at least the steps of:
  i. sulphating a material comprising perovskite and silica to form sulfated material;
  ii. separating a composition (first) comprising calcium sulfate and silica from one or more other components contained in the sulfated material.

In one embodiment of the fifth aspect, the method further comprises the step of washing the first composition comprising calcium sulfate and silica after its separation.

In one embodiment of the fifth aspect, the method further comprises at least the steps of:
  iii. combining the first composition comprising calcium sulfate and silica with water and at least one compound to adjust the pH to from approximately 4 to approximately 9;
  iv. separating solids from liquids to obtain a second composition comprising calcium sulfate and silica.

In another embodiment of the fifth aspect, the method further comprises at least the steps of:
  iii. combining the first composition comprising calcium sulfate and silica with water;
  iv. separating solids from liquids to obtain a second composition;
  v. combining the second composition with water and at least one compound to adjust the pH to from approximately 4 to approximately 9;
  vi. separating solids from liquids to obtain a third composition comprising calcium sulfate and silica.

In one embodiment of the fifth aspect, the methods further comprise drying the first, second or third composition.

It will be appreciated that in certain embodiments of the invention, the first, second or third compositions referred to herein represent composition (A) as referred to elsewhere herein.

In one embodiment of the fifth aspect, the at least one compound to adjust the pH is chosen from calcium hydroxide and calcium oxide.

In one embodiment of the fifth aspect, the material comprising perovskite and silica has a particle size of less than 180 μm. In one embodiment, the material comprising perovskite and silica has a particle size of D90 approximately <250 microns.

In certain embodiments of the fifth aspect, the methods further comprise the step of combining the first, second or third composition resulting from the relevant method with one or more additional material to form the cement additive. In one embodiment, the one or more additional materials comprises a composition (B). In one embodiment, composition (B) is obtained in a process for the recovery one or more metal from a material comprising perovskite and silica. In one embodiment, composition (B) is a by-product of a process for the recovery of one or more metal from a material comprising perovskite and silica. In one embodiment, the one or more metal is titanium, magnesium, aluminium and/or iron.

In one embodiment of the fourth or fifth aspects, the material comprising perovskite and silica is an iron making slag. In another embodiment, the material comprising perovskite and silica is an ore or a natural perovskite concentrate. In a preferred embodiment, the material comprising perovskite and silica is a VTM slag. In another embodiment, the material comprising perovskite and silica is red mud (for example, derived from the Bayer alumina process).

In one embodiment of the fourth or fifth aspects, the one or more other components contained in the sulfated material is at least one or more sulfated metal salts. In one embodiment, the one or more sulfated metal salts are chosen from one or more sulfated titanium salts, one or more sulfated magnesium salts, one or more sulfated aluminium salts.

In one embodiment of the fourth or fifth aspects, the step of separating the composition (first) comprising calcium sulfate and silica from one or more other components contained in the sulfated material comprises contacting a solid sulfated material with water to form a sulfated suspension and then filtering the sulfated suspension to obtain a retentate and a permeate. The retentate comprises the composition comprising calcium sulfate and silica. The permeate comprises the one or more other components contained in the sulfated material.

In a related aspect, the invention provides a cement additive made by a method as defined in the fifth aspect.

In a sixth aspect, the invention provides a cement comprising a cement additive of the first or third aspects of the invention or as made by a method of the fifth aspect.

In one embodiment of the sixth aspect, the cement comprises clinker and a cement additive of the first or third aspects or as made by a method of the fifth aspect. In one embodiment, the cement consists or consists essentially of clinker and a cement additive of the first or third aspects or as made by a method of the fifth aspect. In one embodiment, the cement comprises, consists or consists essentially of clinker, a cement additive of the first or third aspects or as made by a method of the fifth aspect, limestone and a grinding aid.

In one embodiment of the sixth aspect, the cement additive is present in the cement in an amount from approximately 2% to approximately 12% (w/w) of total cement. In another embodiment, the cement additive is present in the cement in an amount of from approximately 2% to approximately 10% (w/w) of total cement. In one embodiment, the cement additive of the invention is present in an amount from approximately 4% to approximately 8% (w/w) of total cement. In a one embodiment, the cement additive is present in an amount of from approximately 6% to approximately 8% (w/w) of total cement. In other embodiments, the cement additive is present in the cement in an amount from approximately 1% to 25% (w/w) of total cement. In other embodiments, the cement additive is present in the cement in an amount of up to approximately 45% (w/w).

In one embodiment of the sixth aspect, the cement is capable of producing a hardened mortar with a compressive strength of at least approximately 30 MPa at 7 days. In another embodiment of the sixth aspect, the cement is capable of producing a hardened mortar with a compressive strength of at least approximately 45 MPa at 28 days.

In a seventh aspect, the invention provides a cementitious product comprising the cement of the sixth aspect or a cement additive of the first or third aspects or as made by a method of the fifth aspect.

In preferred embodiments, the cementitious product is a concrete, mortar, grout, or stucco.

In an eighth aspect, the invention provides an article comprising a hardened cementitious product of the seventh aspect.

In a ninth aspect, the invention provides a method of making cement, the method comprising at least the step of combining a cement additive as defined in the first or third aspects or as made by a method of the fifth aspect of the invention with one or more other cement ingredients.

In a tenth aspect, the invention provides a method of making cement, the method comprising at least the steps of:
   a. sulphating a material comprising perovskite and silica to form sulfated material;
   b. separating a composition (first) comprising calcium sulfate and silica from one or more other components contained in the sulfated material;
   c. combining the first composition with one or more other cement ingredients.

In one embodiment of the tenth aspect, the method further comprises the step of washing the composition comprising calcium sulfate and silica after step b. and before step c. or after step c.

In one embodiment of the tenth aspect, after step b. and prior to step c. the method further comprises at least the steps of:
   b1. combining the first composition comprising calcium sulfate and silica with water and at least one compound to adjust the pH to from approximately 4 to approximately 9;
   b2. Separating solids from liquids to obtain a second composition comprising calcium sulfate and silica.

In another embodiment of the tenth aspect, after step b. and prior to step c. the method further comprises at least the steps of:
   b1. combining the first composition comprising calcium sulfate and silica with water;
   b2. Separating solids from liquids to obtain a second composition;
   b3. combining the second composition with water and at least one compound to adjust the pH to from approximately 4 to approximately 9;
   b4. Separating solids from liquids to obtain a third composition comprising calcium sulfate and silica.

In one embodiment of the tenth aspect, the methods further comprise drying the first, second or third composition.

In one embodiment of the tenth aspect, the at least one compound to adjust the pH is chosen from calcium hydroxide and calcium oxide.

In one embodiment of the tenth aspect, the material comprising perovskite and silica has a particle size of less than 180 µm. In one embodiment of the tenth aspect, the material comprising perovskite and silica has a particle size D90 approximately <250 microns.

In one embodiment of the tenth aspect, the method further comprises the step of combining the composition comprising calcium sulfate and silica with one or more additional materials (as herein described) to form a cement additive: for example, combining the first composition of step b. with one or more additional materials before step c; combining the second composition of step b2. with one or more additional materials before step c; or, combining the third composition of step b4. with one or more additional materials before step c.

In one embodiment, the methods of the ninth or tenth aspects comprise combining a cement additive with clinker.

In certain embodiments, the clinker is ground prior to combining with the cement additive. In a preferred embodiment, the clinker and cement additive are combined and interground.

In certain embodiments, the methods of the ninth or tenth aspects further comprise combining additional ingredients with the cement additive and clinker, in any order.

In another aspect, the invention provides cement made by a method of the ninth or tenth aspects of the invention.

In an eleventh aspect, the invention provides a method of making a cementitious product, the method comprising at least the step of combining cement comprising a cement additive of the first or third aspects or as made by a method of the fifth aspect with a) water or b) an aggregate and water. In one embodiment, the method comprises the steps of the tenth aspect and the additional step of combining the cement with a) water or b) an aggregate and water. In certain embodiments, additional ingredients may be included. In preferred embodiments, the cementitious product is a concrete, mortar, stucco, or grout.

In a twelfth aspect, the invention provides a cementitious product made by a method of the eleventh aspect.

In a preferred embodiment of the methods of the invention (for example, the fifth or tenth aspects), the step i. of sulphating the material comprises contacting the material comprising perovskite and silica with sulfuric acid to form a cake (solid sulfated material), and the step ii. of separating a composition comprising calcium sulfate and silica comprises contacting the cake with water and/or dilute sulfuric acid to form a sulfated suspension and then separating solids from liquid in the sulfated suspension to produce a retentate (first composition comprising calcium sulfate and silica) and a permeate (comprising other components contained in the sulfated material).

The invention also includes the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent to those skilled in the art upon reading of the following description.

DETAILED DESCRIPTION

The inventor has devised novel compositions which are of use as cement additives. In particular, the inventor has surprisingly identified that a composition obtained during the process of recovering titanium dioxide from a melter slag or blast furnace slag can act as a substitute, at least partially, for clinker and/or gypsum and/or pozzolanic material in cement.

Tests show that cement made with the compositions of the invention perform as well as or better, particularly strength-wise, than control cements which do not include the composition. Unexpectedly, mortar tests showed that the compressive strength of mortar samples increased as the amount of a composition of the invention contained in the mortar was increased. In addition, compositions of the invention surprisingly have a higher than expected pozzolanic activity for the level of silica present in them. Further, tests show that mortars containing compositions of the invention generally exhibit quicker setting times compared to controls, which may be beneficial in a number of applications, including but not limited to precast concretes and placement of concrete in low temperature environments. In addition, the inventor contemplates that the use of a composition of the invention may reduce the need to use a cement accelerator (or may reduce the amount of a cement accelerator used) when preparing a cementitious product (for example, a concrete or mortar) for certain applications. While the results generated to date are from compositions obtained from melter and blast furnace slag starting material, the inventor believes that similar compositions could be obtained from other materials comprising perovskite and silica.

The inventor notes that the unexpected characteristics observed for the cement additives of the invention make them particularly suited to use in cements for civil applications where strength, durability and relatively quick set times are desirable.

The use of the compositions of the invention has the advantage of reducing the cost and/or environmental impact of cement manufacture, without compromising on cement quality. For example, being able to reduce the clinker required in cement manufacture by several percent with no compromise in strength delivers a significant cost and environmental savings to a cement maker. Similarly, displacing or replacing the need to use other sources of gypsum in cement has the advantage of reducing the environmental impact and added costs associated with sourcing naturally occurring gypsum for example. The compositions of the invention are also capable of displacing or replacing the need to use supplementary sources of pozzolanic material (such as fly ash and fume silica) offering further efficiencies and cost savings. The compositions of the invention also conveniently provide a single source of gypsum and pozzolanic material of use in the cement industry.

The invention has the further advantage of creating value out of a waste product from an industrial process for recovering metal values (eg titanium dioxide) from feedstocks comprising perovskite and silica, improving the economics of such processes and minimising their environmental impact.

Definitions

Unless otherwise defined, the following terms as used throughout this specification are defined as follows:

Throughout the specification and any claims which follow, unless the context requires otherwise, the word "comprise", and variations such as "comprises" and "comprising" and the like, are to be construed in an inclusive sense as opposed to an exclusive sense, that is to say, in the sense of "including, but not limited to".

As used herein the term "cementitious product(s)" should be understood to mean any product, composition or article comprising at least cement. By way of non-limiting example, "cementitious product(s)" include mortar, grout, stucco, screeds, self-leveling compounds or compositions, and concrete.

The term "cement additive" is used herein to describe compositions of the invention. Use of this term includes reference to those compositions recovered (separated) directly from a sulfated material as well as compositions which have been recovered (separated) and then processed further (for example, by washing, drying and/or combining with one or more other material(s) as described herein).

The invention is described herein with reference to a material "comprising perovskite and silica". "Perovskite" refers to a titanium-calcium oxide mineral composed of calcium titanate $CaTiO_3$. Perovskite typically has a cubic crystalline structure although the term as used herein is intended to refer to any form of calcium titanate, including complexes with other materials. The material may comprise any level of perovskite. The phrase "comprising perovskite and silica" should not be taken to imply that a particular amount of perovskite and/or silica must be present in the material.

Reference is made herein to the cement additive of the invention and the material or feedstock from which it is derived containing "silica". This should be taken broadly to include reference to silica present in the additive or feedstock which is in the form of one or more silicates, for example a metal silicate. For example, it may be said that the cement additive of the invention comprises a particular amount of silica. This should be taken to include reference to the total amount of silica and/or silicates present in the additive.

In certain embodiments, the material comprising perovskite and silica is a "slag"; ie is any waste matter separated from metals during the smelting or refining of an ore. In preferred embodiments, the slag is an iron making slag or a vanadium titano-magnetite (VTM) slag (or VTM-derived slag). "Iron making slag" is a slag resulting from a steel or iron manufacturing process. In certain embodiments, an iron making slag is melter (or smelter) slag or blast furnace slag.

A "VTM slag" is a slag obtained during the processing or manufacture of products (eg steel or iron) from a VTM-containing material, such as a VTM-containing ore.

In other embodiments, the material comprising perovskite and silica is a natural perovskite (i.e. an ore) or concentrate. An "ore" is a naturally occurring solid material from which a metal or mineral may be extracted. In one embodiment, the ore is a vanadium titano-magnetite (VTM-containing) ore.

"Enriched slag" is a material that has had a target metal oxide increased in concentration by separating and removing one or more other metal species, using for example a pyro-metallurgical technique.

The term "reactor" includes any device consisting of one or more vessels and/or towers or piping arrangements in which materials of the invention can be processed, mixed and/or heated. In a preferred embodiment, the reactor(s) is adapted to run a continuous process.

Where reference is made to "recovering" a chemical compound or compounds, it should not be taken to mean that the compound or compounds are recovered or separated in 100% purity. Also, where reference is made to "purifying" (or like terms, such as purification) of a particular chemical compound(s) it should not be taken to mean that the compound(s) is recovered in 100% purity. It will be appreciated that some level of contamination of a compound(s) with other compounds may occur and be tolerated. Similarly, where reference is made to "separating" chemical compound(s) or composition(s) from other components (for example one or more compound or composition), it should not be taken to mean that the compound(s), composition(s) and component(s) are separated from each other completely. It will be appreciated that some level of contamination of one with the other may be present and tolerated. In certain embodiments, the methods of the invention comprise substantially separating a composition comprising calcium sulfate and silica from one or more other components in a material.

The phrase "sulfated metal salts" or "sulfated X salts" (where X is a specific metal) should be taken broadly to mean any sulfate salt including a metal (or the specific metal X), including single or multiple salt forms such as double salts and triple salts. The phrase should be taken to include reference to any hydrated form of the relevant salts. In certain embodiments, sulfated metal salts include sulfated salts of calcium, titanium, magnesium, and/or aluminium. In another embodiment, it includes sulfated salts of iron.

A "sulfated material" is material which has been subject to a sulfation reaction or step.

Where a proportion, ratio or percentage of titanium dioxide in a feedstock is referred to, it will be appreciated by a person skilled in the art that the actual form of the titanium dioxide may not be in a form appropriate to be purified. For example, in perovskite the form of the titanium dioxide is predominantly as calcium titanate ($CaTiO_3$). Where analytical results or wording referring to titanium dioxide are provided, those analytical results or wording are intended to be read as the amount of titanium dioxide that may be bound with other elements, for example in calcium titanate. The same should be understood for other metal oxides referred to herein.

Ratios and percentages may be used herein to define the amount or level of an element or compound in a cement additive, cement, composition or material. These are weight for weight ratios and percentages (% w/w).

"Sulfuric acid" as referred to herein may be of any concentration and is referred to as a weight for weight percentage (% w/w) concentration in aqueous solution. Other nomenclature may include m % or simply %. These are intended to be used interchangeably and will be understood as being so by those of skill in the art.

Features of the invention may be described herein with reference to methods for recovering one or more "metal" from a material or feedstock (for example a material comprising perovskite and silica). Reference to "metal" or a specific metal should be understood to include reference to compounds comprising the metal. For example, reference may be made to method of recovering one or more of titanium, magnesium, aluminium and iron. It should be understood that these metals may be recovered in the form of compounds such as titanium dioxide, magnesium sulfate, aluminium sulfate and iron sulfate, for example.

The specification may include alternative spellings of the words "sulfur", "sulfation", "sulfate" and the like; for example, as "sulphur", "sulphation" and "sulphate".

Reference may be made herein to different types of cement, such as GP, GL, GB, HE, LH, SR or SL cement. GP is a general purpose Portland cement. GL is a general purpose limestone cement. GB is a general purpose blended cement. HE is a high early strength cement. LH is a low heat cement. SL is a shrinkage limited cement. SR is a sulfate resisting cement. Skilled persons will readily understand the nature of such cements. However, by way of example, information on the cements can be found at: www.ccanz.org.nz/page/Cements.aspx The Cement Additive The inventor has devised novel compositions which can be used as cement additives. The cement additives comprise calcium sulfate and silica. In a preferred embodiment, the cement additive is derived from a material comprising perovskite and silica (for example, using the methods and/or steps as herein described).

In one embodiment, the cement additive also comprises one or more metal salt and/or metal oxide. By way of non-limiting example, the additive may comprise metal salts or oxides of magnesium, aluminium, titanium, iron and manganese.

In one embodiment, the cement additive comprises one or more of aluminium oxide, titanium dioxide, magnesium oxide, iron oxide and calcium oxide. In another embodiment, the cement additive comprises all of aluminium oxide, titanium dioxide, magnesium oxide, and iron oxide. In another embodiment, the cement additive comprises all of aluminium oxide, titanium dioxide, magnesium oxide, iron oxide and calcium oxide.

In one embodiment, the cement additive comprises a composition (A) recovered from a method as described herein. In another embodiment, the cement additive comprises a composition (A) recovered from a method as described herein in combination with one or more other materials.

In one embodiment, the one or more other materials is a composition or product (B) produced in a method for recovering one or more metal from a material or feedstock. In one preferred embodiment, the composition or product (B) is produced in a method for recovering one or more metal from a material comprising perovskite and silica. In one embodiment, the composition or product (B) is a by-product of a method for recovering one or more metal from a material comprising perovskite and silica. In one embodiment, the method is for recovering one or more of titanium, magnesium, aluminium and/or iron from a material comprising perovskite and silica. In one embodiment, the method is for recovering titanium dioxide. In another embodiment, the method is for recovering titanium dioxide and aluminium sulfate. In another embodiment, the method is for recovering titanium dioxide, aluminium sulfate and magnesium sulfate. By way of example, the one or more other composition or product (B) produced in a method for recovering one or more metal from a material comprising perovskite and silica is one or more product produced in the method described in PCT/NZ2019/050159, PCT/NZ2015/050085 or PCT/NZ2017/050002.

In another embodiment, the one or more other materials include a material or feedstock used in a method for the recovering of one or more metal, or a derivative thereof. In one embodiment, the methods is for the recovery of one or more of titanium, aluminium, magnesium and/or iron. In one embodiment, the method is for the recovery of one or more of titanium dioxide, aluminium sulfate, and/or magnesium sulfate. In certain embodiments, the feedstock is an ore, ore concentrate, a slag and/or red mud. In a preferred embodiment, the feedstock comprises perovskite. In certain embodiments, the feedstock is one of those exemplified herein after, including but not limited to an iron making slag, melter slag, VTM slag, naturally occurring perovskite-containing ore and red mud.

In one embodiment, the cement additive has set retarding properties. In one embodiment, use of the cement additive in a mortar results in faster set times compared to the use of gypsum in the mortar. In some applications, an accelerated or lower set time for cementitious products is desirable; for example, in precast concretes, concretes for civil applications, or concrete placement in low temperature environments, for example during winter months. In one embodiment, the use of a cement additive of the present invention may reduce or substantially eliminate the need to use a cement accelerator (or reduce the amount of a cement accelerator that is required to be used) when preparing cementitious products. In one embodiment, a cement additive of the invention is capable of producing a cement mortar which is at least approximately 15 minutes (in one embodiment, approximately 15 to approximately 45 minutes (for example, approximately 20.0% to approximately 37.5%)) faster in initial set time than a control cement mortar that does not include a cement additive of the invention and/or at least approximately 20 minutes (in one embodiment, approximately 20 to approximately 60 minutes (for example, approximately 20% to approximately 31%)) faster in final set time; where the test cement comprises a clinker and a cement additive at approximately 8% (w/w) of total cement and the control cement comprises clinker and gypsum at approximately 4.5% w/w of total cement. Tests may be conducted using the methods as described in the Examples section herein after. In certain embodiments, a cement additive of the invention is capable of producing a cement mortar which is approximately 15, approximately 20, approximately 25, approximately 30, approximately 35, approximately 40 or approximately 45 minutes faster in initial set time compared to a control cement mortar as described above. In certain embodiments, a cement additive of the invention is capable of producing a cement mortar which is approximately 20, approximately 25, approximately 30, approximately 35, approximately 40, approximately 45, approximately 50, approximately 55, or approximately 60 minutes faster in final set time compared to a control cement mortar as described above.

In another embodiment, the cement additive has pozzolanic properties. In one embodiment, the cement additive has a level of pozzolanic activity, as determined by J/g heat release using the $R^3$ test procedure, of at least approximately 80 J/g, or more preferably at least approximately 85 J/g. In another embodiment, the cement additive has a level of pozzolanic activity of from approximately 100 J/g to approximately 180 J/g. In another embodiment, the cement additive has a level of pozzolanic activity of from approximately 100 J/g to approximately 110 or approximately 120 J/g. In another embodiment, the cement additive has a level of pozzolanic activity of from approximately 120 or 130 J/g to approximately 160 J/g. In one embodiment, the cement additive has a level of pozzolanic activity of from approximately 115 J/g to approximately 155 J/g (for example, approximately 120, approximately 125, approximately 130, approximately 135, approximately 140, approximately 150 or approximately 155 J/g). In a preferred embodiment, the cement additive has a level of pozzolanic activity of approximately 130 to approximately 155 J/g. In one embodiment, the cement additive has a level of pozzolanic activity substantially equivalent to a medium or a high reactivity fly ash.

In another embodiment, the cement additive improves the potential compressive strength of a cement in which it is used. This is described further herein after. In one embodiment, the invention provides the use of a cement additive of the invention to improve the potential compressive strength of a cement, cementitious material or article in which it is used, relative to a cement, cementitious material or article in which it is not present.

In one embodiment, the cement additive is capable of providing or forming a cement in combination with at least clinker, without the need to include a separate source of gypsum. In another embodiment, the cement additive is capable of providing or forming a cement in combination with at least clinker, without the need to include a separate source of pozzolanic material. In one embodiment, the cement additive is capable of providing or forming a cement in combination with at least clinker, without the need to include a separate source of gypsum and a separate source of pozzolanic material.

In one embodiment, the cement additive of the invention comprises from approximately 5% to approximately 30% (w/w) calcium. In one embodiment, the cement additive of the invention comprises from approximately 10% to approximately 25% calcium. In certain embodiments, the cement additive of the invention comprises approximately 10%, approximately 11%, approximately 12%, approximately 13%, approximately 14%, approximately 15%, approximately 16%, approximately 17%, approximately 18%, approximately 19%, approximately 20%, approximately 21%, approximately 22%, approximately 23%, approximately 24%, or approximately 25% calcium.

In one embodiment, the cement additive of the invention comprises from approximately 40% to approximately 80% calcium sulfate (CaSO4) w/w. In another embodiment, it comprises from approximately 40% to approximately 75% calcium sulfate. In certain embodiments, the cement additive of the invention comprises from approximately 40%, from approximately 45%, from approximately 50%, from approximately 55%, from approximately 60%, from approximately 65%, from approximately 70% or approximately 75% calcium sulfate (CaSO4). In certain embodiments, the cement additive of the invention comprises from approximately 45% to approximately 70%, from approximately 50% to approximately 70%, from approximately 55% to approximately 70%, or from approximately 60% to approximately 70% calcium sulfate (w/w). In other embodiments, the cement additive of the invention comprises approximately 41%, approximately, 42%, approximately 43%, approximately 44%, approximately 45%, approximately 46%, approximately 47%, approximately 48%, approximately 49%, approximately 50%, approximately 51%, approximately 52%, approximately 53%, approximately 54%, approximately 55%, approximately 56%, approximately 57%, approximately 58%, approximately 59%, approximately 60%, approximately 61%, approximately 62%, approximately 63%, approximately 64%, approximately 65% or approximately 66%, approximately 67%, approximately 68%, approximately 69%, approximately 70%, approximately 71%, approximately 72%, approximately 73%, approximately 74%, or approximately 75% calcium sulfate.

In one embodiment, the cement additive of the invention comprises from approximately 5% to approximately 25% (w/w) silicon. In other embodiments, the cement additive of the invention comprises from approximately 5% to approximately 20% silicon or from approximately 5% to approximately 15% silicon. In certain embodiments, the cement additive of the invention comprises approximately 5%, approximately 6%, approximately 7%, approximately 8%, approximately 9%, approximately 10%, approximately 11%, approximately 12%, approximately 13%, approximately 14%, approximately 15%, approximately 16%, approximately 17%, approximately 18%, approximately 19% or approximately 20% silicon.

In one embodiment, the cement additive comprises from approximately 10% to approximately 50% silica (w/w). In other embodiments, it comprises from approximately 10% to approximately 35% or from approximately 10% to approximately 30% silica. In certain embodiments, the cement additive comprises from approximately 10%, from approximately 15%, from approximately 20%, from approximately 25% or from approximately 30% silica. In certain embodiments, the cement additive comprises from approximately 15% to approximately 25% silica. In other embodiments, the cement additive comprises approximately 10%, approximately 11%, approximately 12%, approximately 13%, approximately 14%, approximately 15%, approximately 16%, approximately 17%, approximately 18%, approximately 19%, approximately 20%, approximately 21%, approximately 22%, approximately 23%, approximately 24%, approximately 25%, approximately 26%, approximately 27%, approximately 28%, approximately 29%, or approximately 30% silica.

In one embodiment, the ratio of silicon to calcium present in the cement additive is from approximately 0.3 to approximately 2. In other embodiments, the ratio of silicon to calcium present in the cement additive is from approximately 0.3 to approximately 1 or from approximately 0.3 to approximately 0.9. In one embodiment, the ratio of silicon to calcium present is from approximately 0.35 to approximately 0.85 or from approximately 0.4 to approximately 0.8. In certain embodiments, the ratio of silicon to calcium is approximately 0.3, approximately 0.35, approximately 0.4, approximately 0.45, approximately 0.5, approximately 0.55, approximately 0.6, approximately 0.65, approximately 0.7, approximately 0.75, approximately 0.8, approximately 0.85, approximately 0.90, approximately 0.95 or approximately 1.

In one embodiment, the ratio of silica to calcium sulfate in the cement additive is from approximately 0.2 to approximately 1.2. In other embodiments, the ratio of silica to calcium sulfate in the cement additive is from approximately 0.2 to approximately 0.8, to approximately 0.7, to approximately 0.6 or to approximately 0.5. In certain embodiments, the ratio is approximately 0.2, approximately 0.25, approximately 0.30, approximately 0.35, approximately 0.4, approximately 0.45, approximately 0.50, approximately 0.55, or approximately 0.6. In certain embodiments, the ratio of silica to calcium sulfate in the cement additive is approximately 0.31, 0.32, 0.33, 0.34, 0.35, 0.36, 0.37, or 0.39.

In one embodiment, the calcium sulfate comprises one or more of anhydrous, hemihydrate, or dihydrate calcium sulfate or any other form of calcium sulfate. For example, the calcium sulfate content may include one or more of gypsum and basanite. In one embodiment, the calcium sulfate in the cement additive is a mixture of different hydration states. In one embodiment, the calcium sulfate is in an amorphous form.

In one embodiment, the silica comprises one or more of silica in the form of amorphous silica and silica in the form of one or more metal silicates. By way of example only, the metal silicates may comprise one or more of aluminium, magnesium, titanium, iron, and manganese. In one embodiment, the silicates may comprise one or more of augite, pigeonite, silicate complexes and perovskite-silicates. In one embodiment, the silica present in the compositions/cement additives of the invention is predominantly amorphous (for example, at least approximately 90% amorphous silica).

In one embodiment, the cement additive comprises approximately 4% (w/w) or less Iron. In one embodiment, the cement additive comprises approximately 3% or less iron, more preferably approximately 2% or less iron or approximately 1% or less iron.

In one embodiment, the cement additive comprises approximately 4% (w/w) or less Iron oxide. In one embodiment, the cement additive comprises approximately 3% or less iron oxide, more preferably approximately 2% or less iron oxide or approximately or less 1% iron oxide.

As mentioned above, in one embodiment the cement additive is derived from a material comprising perovskite and silica.

In preferred embodiments, the material comprising perovskite and silica is chosen from a slag, an enriched slag, an ore or an ore concentrate. In one embodiment, the slag is an iron making slag. In one particular embodiment, the iron making slag is melter slag obtained from New Zealand Steel. In other embodiments, the iron making slag is melter slag obtained from South Africa or blast furnace slag obtained from China or Russia. In one embodiment, the iron making slag is a VTM-slag. In another embodiment, the material is an ore concentrate. In certain embodiments, the ore is a natural mineral resource found in alkaline carbonatite ore complexes, for example those found in North America or South America.

In certain embodiments, the material comprising perovskite and silica may comprise a combination of two or more different materials. For example, it may comprise a combination of an ore concentrate and slag or two or more different types of slag and/or concentrates.

In certain embodiments, material comprising perovskite and silica also comprises one or more of aluminium oxide and magnesium oxide. In certain embodiments, the material also comprises one or more of iron oxide and vanadium oxide. In other embodiment, the material may also comprise chrome oxide and/or manganese oxide. As mentioned herein before, the silica content in the material may be present, at least partially, in the form of one or more silicates, such as metal silicates.

In one embodiment, the material comprising perovskite and silica comprises from at least approximately 5% to at least approximately 65% w/w titanium dioxide. In certain embodiments, the material comprises at least approximately 5%, 10%, 15%, 20%, 25%, 30%, 35%, 40%, 45%, 50%, 55%, 60% or 65% w/w titanium dioxide. In certain embodiments, the material comprises approximately 5%, 10%, 15%, 20%, 25%, 30%, 35%, 40%, 45%, 50%, 55%, 60% or 65% w/w titanium dioxide. In certain embodiments, the material comprises from approximately 15% to approximately 60% or to approximately 65% titanium dioxide. In certain embodiments, the material comprises from approximately 30% to approximately 40% titanium dioxide. In one embodiment, the material comprises from approximately 30% to approximately 35% w/w titanium dioxide. In another embodiment, the material comprises from approximately 25% to approximately 45% titanium dioxide. In one embodiment, the material comprises from approximately 5% to approximately 25% titanium dioxide.

In one embodiment, the material is an iron making slag and comprises from at least approximately 5% to at least approximately 40% w/w titanium dioxide. In certain embodiments, the material comprises at least approximately 5%, 10%, 15%, 20%, 25%, 30%, 35% or 40% w/w titanium dioxide. In certain embodiments, the iron making slag comprises from approximately 5% to approximately 65%, from approximately 5% to approximately 60%, from approximately 5% to approximately 55%, from approximately 5% to approximately 50%, from approximately 5% to approximately 45%, from approximately 5% to approximately 40%, from approximately 5% to approximately 35%, from approximately 5% to approximately 30% w/w titanium dioxide. In certain embodiments, the material comprises approximately 5%, 10%, 15%, 20%, 25%, 30%, 35%, 40%, 45%, 50%, 55%, 60% or 65% w/w titanium dioxide. In certain embodiments, the iron making slag comprises from approximately 15% to approximately 40% titanium dioxide, from approximately 15% to approximately 35%, or approximately 15% to approximately 30% w/w titanium dioxide. In certain embodiments, the iron making slag comprises approximately 20%, 21%, 22%, 23%, 24%, 25%, 26%, 27%, 28%, 29%, 30%, 31%, 32%, 33%, 34% or 35% titanium dioxide. In other embodiments, the iron making slag comprises approximately 36%, 37%, 38%, 39%, or 40% titanium dioxide.

In another embodiment, the material is an ore and comprises from at least approximately 15% to at least approximately 60% w/w titanium dioxide. In certain embodiments, the ore comprises at least approximately 5%, 10%, 15%, 20%, 25%, 30%, 35%, 40%, 45%, 50%, 55% or 60% w/w titanium dioxide. In certain embodiments, the ore comprises approximately 5%, 10%, 15%, 20%, 25%, 30%, 35%, 40%, 45%, 50%, 55% or 60% w/w titanium dioxide.

In another embodiment, the material is an ore concentrate and comprises from at least approximately 15% to at least approximately 45% or from at least approximately 25% to at least approximately 45% w/w titanium dioxide. In certain embodiments, the ore concentrate comprises at least approximately 15%, 20%, 25%, 30%, 35%, 40%, or 45% w/w titanium dioxide. In certain embodiments, the ore concentrate comprises approximately 15%, 20%, 25%, 30%, 35%, 40%, or 45% w/w titanium dioxide.

In another embodiment, the material is red mud (for example, derived from the Bayer alumina process) and comprises from at least approximately 5% to at least approximately 25% w/w titanium dioxide. In one embodiment, the red mud comprises approximately 5% to approximately 35% titanium dioxide. In certain embodiments, the red mud comprises approximately 5%, 10%, 15%, 20% or 25% titanium dioxide.

In one embodiment, the material comprises from at least approximately 2% to at least approximately 60% w/w calcium oxide. In one embodiment, it comprises from approximately 2% to approximately 60% calcium oxide. In one embodiment, the material comprises from approximately 5% to approximately 60% calcium oxide. In one embodiment, the material comprises from approximately 5% to approximately 25% w/w calcium oxide. In one particular embodiment, the material comprises from approximately 10% to approximately 20% w/w calcium oxide. In another embodiment, the material comprises from approximately 25% to approximately 40% w/w calcium oxide. In another embodiment, the material comprises from approximately 10% to approximately 60% calcium oxide. In another embodiment, the material comprises from approximately 2% to approximately 10% calcium oxide. In certain embodiments, the material comprises approximately 5%, 10%, 15%, 20%, 25%, 30%, 35%, 40%, 45%, 50%, 55%, or 60% w/w calcium oxide.

In one embodiment, the material is an iron making slag and comprises from at least approximately 5% to at least approximately 40% w/w calcium oxide. In one embodiment, the slag comprises from approximately 5% to approximately 40%, from approximately 5% to approximately 35%, from approximately 5% to approximately 30% or from approximately 5% to approximately 25% w/w calcium oxide. In certain embodiments, the slag comprises approximately 5%, 10%, 15%, 20%, 25%, 30%, 35%, 40% or 45% w/w calcium oxide. In one particular embodiment, the slag comprises from approximately 10% to approximately 30%, w/w calcium oxide. In one embodiment, the slag comprises approximately 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34% or 35% calcium oxide.

In another embodiment, the material is an ore and comprises from at least approximately 10% to at least approximately 60% w/w calcium oxide. In one embodiment, the ore concentrate comprises from approximately 10% to approximately 60% w/w calcium oxide. In certain embodiments, the ore concentrate comprises approximately 10%, 15%, 20%, 25%, 30%, 35%, 40%, 45%, 50%, 55% or 60% w/w calcium oxide.

In another embodiment, the material is an ore concentrate and comprises from at least approximately 15% to at least approximately 40% w/w calcium oxide. In other embodiments it comprises from approximately 15% to approximately 40%, from approximately 20% to approximately 40% or from approximately 25% to approximately 40% w/w calcium oxide. In certain embodiments, the ore concentrate comprises approximately 15%, 20%, 25%, 30%, 35%, or 40% w/w calcium oxide.

In another embodiment, the material is red mud (for example, derived from the Bayer alumina process) and comprises from at least approximately 2% to at least approximately 10% w/w calcium oxide. In one embodiment, the red mud comprises from approximately 2% to approximately 10% w/w calcium oxide. In certain embodiments, the red mud comprises approximately 2%, 3%, 4%, 5%, 6%, 7%, 8%, 9% or 10% calcium oxide.

In one embodiment, the material comprises from at least approximately 1% to at least approximately 50% w/w silica. In one embodiment, the material comprises from approximately 1% to approximately 50% w/w silica. In one embodiment, the material comprises from approximately 1% to approximately 40% silica. In another embodiment, the material comprises from approximately 3% to approximately 50% silica. In certain embodiments, the material comprises approximately 5% to approximately 25% w/w silica. In one particular embodiment, the material comprises from approximately 10% to approximately 20% w/w silica. In another embodiment, the material comprises from approximately 1% to approximately 40% silica. In another embodiment, the material comprises from approximately 10% to approximately 35% silica. In certain embodiments, the material comprises approximately 1%, 2%, 3%, 4%, 5%, 10%, 15%, 20%, 25%, 30%, 35%, or 40% w/w silica.

In one embodiment, the material is an iron making slag and comprises from at least approximately 5% to at least approximately 30% w/w silica. In one embodiment, the slag comprises from approximately 5% to approximately 30% w/w silica. In certain embodiments, the slag comprises approximately 5%, 10%, 15%, 20%, 25%, 30% w/w silica. In one particular embodiment, the slag comprises from approximately 10% to approximately 20% w/w silica. In one embodiment, the slag comprises approximately 10%, 11%, 12%, 13%, 14%, 15%, 16%, 17%, 18%, 19%, 20%, 21%, 22%, 23%, 24%, 25%, 26%, 27%, 28% 29% or 30% silica.

In another embodiment, the material is an ore and comprises from at least approximately 1% to at least approximately 40% w/w silica. In one embodiment, the titanium-bearing material is an ore and comprises from approximately 1% to approximately 40% w/w silica. In certain embodiments, the titanium-bearing material is an ore and comprises approximately 5%, 10%, 15%, 20%, 25%, 30% or 40% w/w silica.

In another embodiment, the material is an ore concentrate and comprises from at least approximately 10% to at least approximately 35% w/w silica. In one embodiment, the material is an ore concentrate and comprises from approximately 10% to approximately 35% w/w silica. In certain embodiments, the material is an ore concentrate and comprises approximately 10%, 15%, 20%, 25%, 30% or 35% w/w silica.

In another embodiment, the material is red mud (for example, derived from the Bayer alumina process) and comprises from at least approximately 3% to at least approximately 50% w/w silica. In one embodiment, the red mud comprises from approximately 3% to approximately 50% w/w silica. In certain embodiments, the red mud comprises approximately 3%, 5%, 10%, 15%, 20%, 25%, 30%, 40%, 45%, or 50% w/w silica.

In one embodiment, the material comprises from at least approximately 0% to at least approximately 20% w/w magnesium oxide. In one embodiment, the material comprises from approximately 0% to approximately 20% w/w magnesium oxide. In one embodiment, the material comprises from approximately 1% to approximately 20% or from 5% to approximately 20% magnesium oxide. In another embodiment, the material comprises from approximately 10% to approximately 15% magnesium oxide. In another embodiment, the material comprises from approximately 1% to approximately 5% magnesium oxide. In certain embodiments, the material comprises approximately 1%, 2%, 3%, 4%, 5%, 10%, 15%, or 20%, w/w magnesium oxide.

In one embodiment, the material is an iron making slag and comprises least approximately 5% to approximately 20% w/w magnesium oxide. In certain embodiments, the titanium-bearing material comprises approximately 5%, 10%, 15%, or 20%, w/w magnesium oxide. In one particular embodiment, the material comprises from approximately 10% to approximately 15% w/w magnesium oxide. In one embodiment, the material comprises approximately 10%, 11%, 12%, 13%, 14% or 15% magnesium oxide.

In another embodiment, the titanium-bearing material is an ore and comprises from at least approximately 0% to at least approximately 5% magnesium oxide. In one embodiment, the ore comprises from approximately 0% to approximately 5% magnesium oxide. In one embodiment, the ore comprises from at least approximately 1% to at least approximately 5% magnesium oxide. In one embodiment, the ore comprises from approximately 1% to approximately 5% magnesium oxide. In certain embodiments, the ore comprises approximately 1%, 2%, 3%, 4% or 5% w/w magnesium oxide.

In another embodiment, the material is an ore concentrate and comprises from at least approximately 1% to at least approximately 5% magnesium oxide. In one embodiment, the ore concentrate comprises from approximately 1% to approximately 5% magnesium oxide. In certain embodiments, the ore concentrate comprises approximately 1%, 2%, 3%, 4% or 5% w/w magnesium oxide. In one embodiment, the ore concentrate comprises from approximately 2% to approximately 3%, for example 2.5%.

In one embodiment, the material comprises from at least approximately 0% to at least approximately to at least approximately 25% w/w aluminium oxide. In one embodiment, the material comprises from approximately 0% to approximately 25% aluminium oxide. In one embodiment, the material comprises from approximately 10% to approximately 25% w/w aluminium oxide. In one particular embodiment, the material comprises from approximately 15% to approximately 20% w/w aluminium oxide. In another embodiment, the material comprises from approximately 10% to approximately 20% w/w aluminium oxide. In another embodiment, the material comprises from approximately 0% to approximately 15% aluminium oxide. In one embodiment, the material comprises from approximately 1% to approximately 15% aluminium oxide. In another embodiment, the material comprises from approximately 1% to approximately 10% aluminium oxide. In certain embodiments, the material comprises approximately 1%, 2%, 3%, 4%, 5%, 6%, 7%, 8%, 9%, 10%, 11%, 12%, 13%, 14%, 15%, 16%, 17%, 18%, 19%, 20% or 25% aluminium oxide.

In one embodiment, the material is an iron making slag and comprises from at least approximately 10% to at least approximately 25% w/w aluminium oxide. In one embodiment, the slag comprises from approximately 10% to approximately 25% w/w aluminium oxide. In certain embodiments, slag comprises approximately 10%, 15%, 20%, 25% w/w aluminium oxide. In one particular embodiment, the slag comprises from approximately 10% to approximately 20% w/w aluminium oxide. In one embodiment, the slag comprises approximately 10%, 11%, 12%, 13%, 14%, 15%, 16%, 17%, 18%, 19% or 20% aluminium oxide.

In another embodiment, the material is an ore and comprises from at least approximately 0% (or at least approximately 1%) to at least approximately 15% aluminium oxide. In one embodiment, the ore comprises from approximately 0% (or approximately 1%) to approximately 15% aluminium oxide. In one embodiment, the ore comprises from at least approximately 1% to at least approximately 10% aluminium oxide. In one embodiment, the ore comprises from approximately 1% to approximately 10% aluminium oxide. In certain embodiments, the ore comprises approximately 1%, 2%, 3%, 4%, 5%, 6%, 7%, 8%, 9% or 10% w/w aluminium oxide.

In another embodiment, the material is an ore concentrate and comprises from at least approximately 1% to at least approximately 10% aluminium oxide. In one embodiment, the ore concentrate comprises from approximately 1% to approximately 10% aluminium oxide. In certain embodiments, the ore concentrate comprises approximately 1%, 2%, 3%, 4%, 5%, 6%, 7%, 8%, 9% or 10% w/w aluminium oxide. In one embodiment, the ore concentrate comprises from approximately 5% to approximately 8% aluminium oxide.

In one embodiment, the material is red mud (for example, derived from the Bayer alumina process) and comprises from at least approximately 10% to at least approximately 20% aluminium oxide. In one embodiment, the red mud comprises from approximately 10% to approximately 20% aluminium oxide. In certain embodiments, the red mud comprises approximately 10%, 11%, 12%, 13%, 14%, 15%, 16%, 17%, 18%, 19% or 20% aluminium oxide.

In one embodiment, the material comprises from at least approximately 0% to at least approximately 60% w/w iron oxide. In one embodiment, the material comprises from approximately 0% to approximately 60% w/w iron oxide. In one embodiment, the material comprises from approximately 30% to approximately 60% w/w iron oxide. In one embodiment, the material comprises from approximately 0% to approximately 10% w/w iron oxide. In one embodiment, the material comprises from approximately 1% to approximately 5% w/w iron oxide. In certain embodiments, the material comprises approximately 1%, 2%, 3%, 4%, 5%, 6%, 7%, 8%, 9% or 10% w/w iron oxide. In other embodiments the material comprises approximately 30%, 35%, 40%, 45%, 50%, 55%, or 60% iron oxide.

In one embodiment, the material is an iron making slag and comprises from at least approximately 0% to at least approximately 10% w/w iron oxide. In one embodiment, the slag comprises from approximately 0% to approximately 10% iron oxide. In one embodiment, the slag comprises from at least approximately 1% to at least approximately 5% iron oxide. In one embodiment, the slag comprises from approximately 1% to approximately 5% iron oxide. In certain embodiments, the slag comprises approximately 1%, 2%, 3%, 4%, 5% or 6% iron oxide.

In another embodiment, the material is an ore or an ore concentrate and comprises from at least approximately 0% to at least approximately 5% or 10% w/w iron oxide. In one embodiment, the ore or concentrate comprises from approximately 0% to approximately 5% or approximately 10% iron oxide. In certain embodiments, the ore or ore concentrate comprises approximately 0%, 1%, 2%, 3%, 4%, 5%, 6%, 7%, 8%, 9% or 10% iron oxide.

In one embodiment, the material is red mud (for example, derived from the Bayer alumina process) and comprises from at least approximately 30% to at least approximately 60% iron oxide. In one embodiment, the red mud comprises from approximately 30% to approximately 60% iron oxide. In certain embodiments, the red mud comprises approximately 30%, 35%, 40%, 45%, 50%, 55% or 60% w/w iron oxide.

In other embodiments, the material further comprises vanadium oxide. In certain embodiments, the material comprises from at least approximately 0% to at least approximately 2% vanadium oxide. In one embodiment, the material comprises from approximately 0% to approximately 2% vanadium oxide. In certain embodiments, the material is an iron making slag or ore or ore concentrate and comprises from approximately 0% to approximately 1%, or from approximately 0% to approximately 0.5%, or from approximately 0.25% to 0.5% vanadium oxide. In certain embodiments, the slag, ore or ore concentrate comprises approximately 0.1%, 0.2%, 0.3%, 0.4%, 0.5%, 0.6%, 0.7%, 0.8%, 0.9% or 1% vanadium oxide.

In one embodiment, the material is an iron making slag produced as a result of an iron or steel manufacturing process. An example of iron making slag constituents is provided below in Table 1, which details the constituents of melter slag produced in New Zealand by NZ Steel's steel manufacturing process. Values are determined using the X-ray fluorescence analytical technique.

TABLE 1

| NZ Steel Melter Slag | |
|---|---|
| Constituent | m % |
| $TiO_2$ | 32.1-33.3 |
| $Al_2O_3$ | 17.8-19 |
| MgO | 13.2-13.3 |
| CaO | 15.5-15.9 |
| $SiO_2$ | 12.8-15.2 |
| $Fe_2O_3$ | 2.34-3.9 |
| $V_2O_5$ | 0.2 |

Further examples of iron making slag constituents are provided in Example 12 herein after.

In a preferred embodiment, the material is a slag and comprises from approximately 15% to approximately 65% titanium dioxide, approximately 5% to approximately 40% calcium oxide, approximately 5% to approximately 30% silica, approximately 5% to approximately 20% magnesium oxide, and approximately 10% to approximately 25% aluminium oxide.

In one embodiment, the material comprises from approximately 5% to approximately 30% calcium w/w. In one embodiment, the material comprises from approximately 10% to approximately 30% calcium and may be, for example, an iron making slag. In certain embodiments, the material comprises approximately 5%, approximately 6%, approximately 7%, approximately 8%, approximately 9%, approximately 10%, approximately 11%, approximately 12%, approximately 13%, approximately 14%, approximately 15%, approximately 16%, approximately 17%, approximately 18%, approximately 19%, approximately 20%, approximately 21%, approximately 22%, approximately 23%, approximately 24%, approximately 25%, approximately 26%, approximately 27%, approximately 28%, approximately 29% or approximately 30% calcium w/w.

In one embodiment, the material comprises from approximately 5% to approximately 20% silicon w/w. In one embodiment, the material comprises from approximately 5% to approximately 15% silicon and may be, for example, an iron making slag. In certain embodiments, the material comprises approximately 5%, approximately 6%, approximately 7%, approximately 8%, approximately 9%, approximately 10%, approximately 11%, approximately 12%, approximately 13%, approximately 14%, approximately 15%, approximately 16%, approximately 17%, approximately 18%, approximately 19% or approximately 20% silicon w/w.

In one embodiment, the ratio of silicon to calcium present in the material is from approximately 0.2 to approximately 2. In certain embodiments, the ratio of silicon to calcium present is from approximately 0.2 to approximately 1.8 or from approximately 0.2 to approximately 1.5. In one embodiment, the ratio of silicon to calcium present is from approximately 0.2 to approximately 1 and may be, for example, an iron making slag. In certain embodiments, the ratio of silicon to calcium is approximately 0.2, approximately 0.3, approximately 0.4, approximately 0.5, approximately 0.6, approximately 0.7, approximately 0.8, approximately 0.9, or approximately 1.

In one embodiment, the ratio of silica to calcium oxide in the material is from approximately 0.5 to approximately 2.5. In other embodiments, the ratio is from approximately 0.6 to approximately 2.2, or from approximately 0.7 to approximately 2.1, or from approximately 0.6 to approximately 2. In other embodiments, the ratio is from approximately 0.5 to approximately 1.1, from approximately 0.5 to approximately 1, or from approximately 0.6 to approximately 0.9. In certain embodiments, the ratio is approximately 0.5, approximately 0.6, approximately 0.7, approximately 0.8, approximately 0.9, or approximately 1.

In one embodiment, the ratio of titanium dioxide to calcium oxide (TiO2:CaO) in the material is from approximately 0.2 to approximately 3. In certain embodiments, the ratio is from approximately 0.2 to approximately 2.5 or from approximately 0.2 to approximately 2.

In one embodiment, the ratio of titanium dioxide to magnesium oxide (TiO2:MgO) in the material is from approximately 0.5 to approximately 25. In another embodiment the ratio is from approximately 0.5 to approximately 18. In one embodiment, the ratio is from approximately 0.5 to approximately 10. In certain embodiments, the ratio is from approximately 0.7 or approximately 0.8 to approximately 3 or to approximately 4, or from approximately 4 to approximately 10.

In one embodiment, the ratio of titanium dioxide to aluminium oxide (TiO2:Al2O3) in the material is from approximately 0.2 to approximately 21. In another embodiment, the ratio is from approximately 0.2 to approximately 6. In another embodiment, the ratio is approximately 0.2 to approximately 2.6. In one embodiment, the ratio is from approximately 0.5 to approximately 2.5. In another embodiment, the ratio is from approximately 1 to approximately 5.

In a preferred embodiment, the material is a slag and comprises a ratio of titanium dioxide to aluminium oxide of from approximately 0.5 to approximately 2.5, a ratio of titanium dioxide to calcium oxide of from approximately 0.2 to approximately 2.5, and a titanium dioxide to magnesium oxide ratio of from approximately 0.7 to approximately 4. In a preferred embodiment, the titanium-bearing material is a slag (for example, an iron making slag or VTM slag).

Methods of Making Additive

In one embodiment, the cement additive is derived from the material comprising perovskite and silica by a process which involves i. sulphating the material comprising perovskite and silica to form sulfated material; and, ii. separating a composition comprising calcium sulfate and silica from one or more other components contained in the sulfated material to form the cement additive. In one embodiment, the method further comprises the step of washing the composition comprising calcium sulfate and silica after its separation to form a cement additive. In one embodiment, the method further comprises the step of drying the composition comprising calcium sulfate and silica for form a cement additive. In certain embodiments, the method further comprises the step of combining the composition comprising calcium sulfate and silica with one or more other materials to form a cement additive.

The material comprising perovskite and silica may be used in any suitable form, as will be appreciated by persons of ordinary skill in the art. However, in a preferred embodiment, the material is in particulate form. The particulate material may be prepared accordingly to known methods, such as grinding. In certain embodiments, methods of the invention may further comprise the step of grinding the material prior to sulfation. Those of ordinary skill in the art will readily appreciate means to grind the material. However, by way of example, grinding may occur using a ball mill.

In preferred embodiments, the material comprising perovskite and silica is in a particulate form having an average particle size of less than 180 µm. In preferred embodiments, the material has an average particle size from 10 to 180 µm, or from 40 to 110 µm. In particular embodiments, the material has an average particle size of approximately 30 µm, 45 µm, 60 µm, 70 µm, 80 µm, 90 µm, or 100 µm. In one preferred embodiment, the material is processed to have a target size of D90 approximately <250 microns. The inventor notes that if the feedstock material particle size is within these ranges it may contribute to producing a cement additive of the invention comprising solid particles having a range of particle sizes. The inventor believes that this range of particle sizes can, in addition to the pozzolanic activity observed in the compositions of the invention, enhance the strength of cement and cementitious products which include it.

Sulfation of the material comprising perovskite and silica may occur using any appropriate methods as would be understood by a skilled person. However, by way of example, the process would generally involve combining the material comprising perovskite and silica with a sulfate source (for example, sulfuric acid, ammonium sulfate, ammonium bisulfate) in any appropriate amount, with or without heat, to form sulfated material comprising one or more sulfated metal salt, including one or more sulfated calcium salt, and silica. In one embodiment, the sulfated material comprises at least one or more of sulfated titanium salt, one or more sulfated magnesium salt and/or one or more sulfated aluminium salt. Depending on the nature and amount of sulfate source used in the sulfation step, the resulting sulfated material may be a solid or a mixture comprising a liquid and one or more solid substance in suspension (eg a slurry), for example. Where it is a mixture comprising a liquid with one or more solid substance in suspension, the overall method may comprise the additional step of filtering the mixture to obtain solid sulfated material.

The sulfated material is then processed (for example, leached) and a composition in accordance with the invention is separated from other components in the sulfated material.

In a preferred embodiment, the sulfation step comprises introducing the material comprising perovskite and silica to an appropriate reactor where it is combined with a desired amount of sulphuric acid to form a sulphated mixture.

The reaction may be conducted at atmospheric pressure and external heat applied so that the sulphated mixture reaches a temperature of from approximately 130 degrees C. to approximately 250 degrees C. In one embodiment, the temperature is from approximately 130 degrees C. to approximately 220 degrees C. In a preferred embodiment, the temperature is from approximately 170 or from approximately 180 degrees C. to approximately 210 degrees C. In one preferred embodiment, the temperature is below approximately 210 degrees C. External heating may be applied using any known means. However, by way of example, addition of heated air or steam, the use of a jacketed reactor with heated thermal fluid or a jacketed reactor with steam, indirect infrared heating or contact electrical heat tracing.

The reaction is allowed to continue for a time sufficient to convert a desired amount of the oxides present in the material comprising perovskite and silica to sulphates. Any silicon in the starting material will not react. In one embodiment, the reaction is run for a period of time long enough to allow at least approximately 70%, 75%, 80% or at least approximately 85% or approximately 90% of the oxides in the material to be converted to sulphates.

In one embodiment, the reaction is conducted (ie mix held at temperature), or the sulfated mixture is contained within the reactor, for a period of from approximately 30 minutes to approximately 4 hours. In one preferred embodiment, the reaction is conducted for a period of up to approximately 3 hours, for example from approximately 30 minutes to approximately 3 hours. In another preferred embodiment, the reaction is conducted for up to approximately 2 hours, for example from approximately 30 minutes to approximately 2 hours, approximately 30 minutes to approximately 90 minutes, or approximately 30 minutes to approximately 1 hour. In another preferred embodiment, the reaction is conducted for less than approximately 2 hours. In certain preferred embodiments, the reaction time is approximately 30 minutes, approximately 45 minutes, approximately 60 minutes, approximately 75 minutes, approximately 90 minutes, approximately 105 minutes or approximately 2 hours. In another embodiments, the reaction time is approximately 3 hours or approximately 4 hours.

The concentration of sulfuric acid used in the sulfation reaction is preferably from at least approximately 50%. In certain embodiments, the concentration is at least approximately 60%, 65%, 70%, 75%, 80%, 85% 90%, 95%, or at least approximately 98%. In one embodiment, the concentration of sulfuric acid used is from approximately 68% to approximately 98%. In preferred embodiments, the concentration of the sulfuric acid used is from approximately 75% to approximately 98%, more preferably approximately 80% to approximately 95% or approximately 80% to approximately 90%.

The ratio of sulfuric acid to material comprising perovskite and silica used in the sulfation reaction is preferably from approximately 0.75:1 to approximately 2:1. In one embodiment, the ratio is above approximately 1.3:1. In preferred embodiments, the ratio of sulfuric acid to titanium-bearing material is from approximately 1.3:1 to approximately 1.7:1, for example approximately 1.3:1, approximately 1.4:1, approximately 1.5:1, approximately 1.6:1 to approximately 1.7:1.

In a preferred embodiment, the reactor is a continuous reactor.

By way of further example, any of the sulfation methods and conditions described in PCT/NZ2019/050159 may be used.

In preferred embodiments, the reaction is conducted at a temperature from approximately 170 to approximately 210 degrees C. using approximately 75% to approximately 98% (preferably approximately 80% to approximately 95% or approximately 80% to approximately 90%, for example, 75, 80, 85, 90, or 95%) sulfuric acid. The reaction is preferably conducted for a period of up to approximately 3 hours (or up to or less than approximately 2 hours—for example, approximately 30, approximately 45, approximately 60, approximately 75, approximately 90, approximately 105). The ratio of sulfuric acid to titanium-bearing material used is preferably from approximately 0.75:1 to 2:1 (more preferably, above approximately 1.3:1, or from approximately 1.3:1 to 1.7:1, for example 1.4:1, 1.5:1, 1.6:1 or 1.7:1). In these preferred embodiments, the reactor used is preferably a one which is adapted to convert solid reaction product to a particulate or powdered sulfate cake. In a preferred embodiment, the titanium-bearing material is a slag, more preferably an iron making slag or a VTM-slag.

In other embodiments, the sulfation of the material occurs as described in PCT/NZ2015/050085 or PCT/NZ2017/050002. In these methods, the material comprising perovskite and silica is sulphated by a method comprising contacting the material with sulfuric acid in an amount which forms sulphated material in the form of a mixture comprising a liquid and one or more solid substance in suspension (eg a slurry) and then filtering the sulphated material to produce a filter cake (solid sulfated material) comprising sulphated metal species including calcium sulfate and silica, and a permeate comprising sulfuric acid.

The step of separating a composition comprising calcium sulfate and silica from one or more other components contained in the sulfated material may occur using any appropriate methods as would be understood by a skilled person with reference to the sulfation method used. However, by way of example, the separation process would generally involve a leaching step comprising contacting solid sulfated material with water (or dilute sulfuric acid, for example) to form a sulfated suspension and then processing the sulfated suspension to recover an insoluble residue and a permeate. The sulfated suspension may be processed by any means sufficient to separate the insoluble residue and permeate. However, by way of example filtration may be used. The insoluble reside comprises calcium sulfate and silica and the permeate comprises the one or more other components from which it is to be separated. In one embodiment, the composition comprising calcium sulfate and silica is substantially separated from at least one or more of titanyl sulfate, magnesium sulfate, aluminium sulfate.

In one embodiment, the leaching step (eg. contacting solid sulfated material with water or dilute acid and filtering) may be conducted at any appropriate temperature. However, in a preferred embodiment it is conducted at from approximately 30 degrees C. to approximately 95 degrees C., or from approximately 50 degrees C. to approximately 90 degrees C., or from approximately 30 to approximately 80 degrees C. In certain embodiments, it is conducted at approximately 35, 40, 45, 50, 55, 60, 65, 70, 75, 80, 85, 90, or 95 degrees C. Water is preferably mixed with the solid material in a ratio of from approximately 0.5:1 or from approximately 0.75:1 to approximately 2:1, for example approximately 1:1. Where dilute sulfuric acid is used it is used at a concentration of from approximately 0.5% or approximately 1% to approximately 15% of the liquid used to leach the solid material. In other embodiments, a concentration of from approximately 0.5% to approximately 15%, from approximately 5% to approximately 15%, or from approximately 5% to approximately 10% is used. In one embodiment, where dilute sulfuric acid is used, the pH of the liquid used to leach the cake is approximately 2 or lower. The leaching step is performed for a sufficient time to allow for a desired level of extraction of the sulphate species from the solid material. In one embodiment, leaching is performed for a sufficient time to allow at least approximately 70%, 75%, 80%, 85%, 90%, or 95% of the sulphate species are extracted from the solid material. In certain embodiments, leaching is performed for a period of from approximately 30 minutes to approximately 4 hours, or from approximately 30 minutes to approximately 2 hours. In certain embodiments, the leaching is performed for approximately 30 minutes, 1 hour, 2 hours, 3 hours or 4 hours. Leaching may be conducted in any suitable vessel as will be readily appreciated by those of skill in the art. Sulphate species (including, for example, titanyl sulfate, magnesium sulfate, aluminium sulfate) present in the sulfated material will dissolve during leaching; $CaSO_4$, $SiO_2$ and any other unreacted oxides will not.

In a preferred embodiment, the sulphated suspension is then subjected to a separation step to separate dissolved sulphate species (for example, titanyl sulfate, magnesium sulfate, aluminium sulfate) from undissolved compounds (ie to separate solids from liquid). Filtration is preferred however other methods may be used. Separation results in an insoluble residue or retentate comprising at least $CaSO_4$ and $SiO_2$ and a permeate comprising, for example, at least one or more of titanyl sulfate, magnesium sulfate and aluminium sulfate. The retentate may comprise other unreacted oxides (such as silicates) as a result of being encapsulated by a refractory material or due to incomplete reaction of the feed material.

Filtering of the sulphated mixture may occur using any suitable filtration means, as will be known to persons skilled in the art. However, by way of example, the filtration means may comprise a filter and a filter press. In one embodiment, the filtration unit is assisted by a differential pressure gradient across the filter.

The separation step is conducted for a sufficient time to allow for substantial separation of the permeate and retentate (composition comprising calcium sulfate and silica and one or more other components). However, in certain embodiments the separation step is conducted for a period from approximately 15 minutes to approximately 3 hours, for example for approximately 15 mins, 30 mins, 45 mins, 1 hour, 2 hours or 3 hours.

In a preferred embodiment, the separation step is conducted at a temperature above the freezing point of metal salts present.

In certain embodiments, the separation occurs as described in PCT/NZ2019/050159, PCT/NZ2015/050085 or PCT/NZ2017/050002.

After separation and recovery of the retentate (cement additive) from a sulfation process, it may be further processed using standard methods prior to use as a cement additive. By way of example, it may be washed, dried and pelletized, granulated, powdered to any suitable size, combined with one or more other material (ingredient), and/or formed into briquets using standard methodology. In other words, and as will be apparent from the description herein, reference to a cement additive herein includes reference to a cement additive comprising the retentate (ie a composition comprising calcium sulfate and silica obtained or derived from a material comprising perovskite and silica) processed in such ways, including reference to a cement additive comprising the retentate combined with one or more other material. In one embodiment, the cement additive is provided in pellets and is interground with clinker as described later herein.

In one preferred embodiment, after the retentate is separated and recovered it is subjected to a washing process. In a preferred embodiment, the process comprises washing the retentate with water and/or a mixture of water and at least one compound which can at least partially and preferably substantially neutralise any acid present. In a preferred embodiment, the process comprises washing the retentate with a mixture of water and at least one compound which can at least partially and preferably substantially neutralise any acid present. A separation (solids from liquids) step, preferably a filtration step, is then conducted to form a calcium sulfate and silica rich composition which can be used as or in a cement additive in accordance with the invention.

In one preferred embodiment, the washing process comprises washing the retentate with water, separating solids and liquids (eg by filtering), obtaining solids and then combining those solids with water and at least one compound which can at least partially and preferably substantially neutralise any acid present. A further solid/liquid separation step (preferably a filtration step) is then conducted to form a calcium sulfate and silica rich composition which can be used as or in a cement additive in accordance with the invention.

In a preferred embodiment, the at least one compound is combined with solids and water to adjust the pH to from approximately 4 to approximately 9. In certain embodiments, the pH is adjusted to from approximately 5 to approximately 8 or from approximately 6 to approximately 7.

In one embodiment, the at least one compound which can at least partially and preferably substantially neutralise any acid present is CaO or $Ca(OH)_2$. In another embodiment, the compound is NaOH.

In a preferred embodiment, i) the retentate (first composition) comprising calcium sulfate and silica is combined with water and at least one compound to adjust the pH to from approximately 4 to approximately 9; ii) solids and liquids in the mixture are separated (eg by filtration) to obtain a second composition comprising calcium sulfate and silica which can be used as or in a cement additive of the invention.

In another preferred embodiment, i) the retentate (first composition) comprising calcium sulfate and silica is combined with water; ii) solids and liquids in the mixture are separated (preferably by filtration) to obtain a second composition; iii) the second composition is combined with water and at least one compound to adjust the pH to from approximately 4 to approximately 9; iv) solids and liquids are separated in the mixture (preferably by filtration) to obtain a third composition comprising calcium sulfate and silica which can be used as or in a cement additive of the invention.

In certain embodiments, the first composition and/or the second composition are combined with water at a ratio of from approximately 2 or approximately 3 to approximately 10 times the solid mass of the first or second composition. In one embodiment, the ratio is approximately 5 times the solid mass.

In certain embodiments, the combined water and the first composition are agitated for a time of from approximately 1 to approximately 3 hours. In one embodiment they are agitated for approximately 1.5 hours.

In certain embodiments, were the pH is adjusted the combined compositions/solids and water are held at the relevant pH for a period of from approximately 1 to approximately 3 hours. In certain embodiments, they are held at the relevant pH for a period of approximately 1 or approximately 1.5 hours.

In a preferred embodiment, the composition obtained at the end of the process is dried. In preferred embodiments, the compositions/solids are dried at an elevated temperature. In certain embodiments, the compositions are dried at a temperature of from approximately 50 to approximately 90 degrees, or approximately 100 degrees. In certain embodiments, the temperature is approximately 70 degrees or approximately 130 degrees. In certain embodiments, the compositions are dried at the relevant temperature for a desired period. In one preferred embodiment, the compositions are dried for a period of approximately 12 hours or overnight.

In particular embodiments, the retentate is combined with water at a ratio of from approximately 2 to approximately 10 times (for example, approximately 5 times) the solid mass of the retentate and agitated for from approximately 1 to approximately 3 hours (for example approximately 1.5 hours) and then filtered. The solids resulting from the washing step are then subjected to a further step in which they are combined with water at a ratio of from approximately 2 to approximately 10 times (for example, approximately 5 times) the solid mass and Ca(OH)2 is added until the pH is from approximately 4 to approximately 9 (for example, from approximately 5 to approximately 8, or from approximately 6 to approximately 7), held for a period of from approximately 1 to approximately 3 hours, (for example approximately 1 or approximately 1.5 hours) and then filtered. Solids may then be dried (for example, at a temperature of approximately 70 degrees C. or approximately 130 degrees C.) for a desirable period (for example, approximately 12 hours or overnight). By way of further example, the combinations of washing conditions and steps described in the Examples herein after may be used.

In one embodiment, a cement additive of the invention consists essentially of a composition comprising calcium sulfate and silica recovered from the material comprising perovskite and silica (before (first composition) and preferably after the washing and neturalisation steps described above (second or third composition)). However, in other embodiments such compositions are combined with one or more other materials (as described herein before) to form the cement additive. In this embodiment, methods of the invention may further comprise combining the relevant composition with the one or more additional materials in any order and using any appropriate means, such as mixing. In one embodiment, the composition may be washed and/or further processed (as described herein before) prior to combining with the one or more additional materials. In another embodiment, the composition may be combined with one or more other materials and then washed and/or further processed desired.

In one embodiment, the one or more additional materials comprises a composition (B) obtained in a process for the recovery of one or more metal from a material comprising perovskite and silica. In one embodiment, the one or more metal is titanium, magnesium, aluminium and/or iron. In one embodiment, composition (B) is a by-product of the process for the recovery of one or more metal from a material comprising perovskite and silica. In another embodiment, the one or more additional materials includes a feedstock used in a method for the recovering of one or more metal, or a derivative thereof.

The methods or one or more steps of the methods used to recover or prepare a cement additive of the invention may be conducted batch-wise or in a continuous manner.

Cement

The cement additive of the invention may be used to partially displace clinker in cement manufacture or to partially, and preferably fully, replace the need to add gypsum to cement during manufacture, or to at least partially replace pozzolanic material in clinker or cement.

The cement additive may be used in the manufacture of any appropriate cement as will be understood by a person of skill in the art. However, by way of example, the cement additive may be used in the manufacture of a cement chosen from the group comprising: hydraulic cement, Portland cement, GP cement, GB cement, GL cement, HE cement, LH cement, SL cement, SR cement. The cement additive may also be used in the manufacture of specialty cements, for example super sulfated cements (SSC) or calcium sulfoaluminate cements (CSA).

In one aspect the invention provides cement comprising a cement additive as described herein along with one or more other cement ingredients.

In a preferred embodiment, the one or more other cement ingredients comprises at least clinker. In another embodiment, the one or more other cement ingredients comprises at least a premade cement. In other embodiments, the one or more other cement ingredients comprises gypsum. However, in a preferred embodiment, the use of the cement additive of the invention obviates the need to include additional gypsum in the cement. In one embodiment, the one or more other cement ingredients includes limestone and/or a grinding aid.

In a preferred embodiment, the cement comprises clinker and a cement additive as described herein. In one embodiment, the cement consists (or consists essentially) of clinker and a cement additive of the invention. In one embodiment, the cement consists (or consists essentially) of clinker, a cement additive of the invention and one or more additional cement ingredients, wherein the one or more additional ingredients do not include gypsum (or at least substantially no gypsum). In another embodiment, the cement consists (or consists essentially) of clinker, a cement additive of the invention and one or more additional cement ingredients, wherein the one or more additional ingredients do not include pozzolanic material (or at least substantially no pozzolanic material). In one embodiment, the cement comprises, consists or consists essentially of clinker, a cement additive of the invention, limestone and a grinding aid. In one embodiment, the cement comprises, consists or consists essentially of clinker, a cement additive of the invention, and one or both of limestone and a grinding aid.

In an alternative embodiment, the cement comprises a premade cement and a cement additive as described herein.

In another embodiment, the cement comprises clinker, gypsum and a cement additive as described herein.

In certain embodiments, the cement additive of the invention is present in cement in an amount from approximately 1% to approximately 25% (w/w) of total cement. In one embodiment, the cement additive is present in the cement an amount from approximately 2% to approximately 10% (w/w). In one embodiment, the cement additive of the invention is present in an amount from approximately 4% to approximately 8% (w/w) of total cement. In one embodiment, the cement additive is present in an amount of from approximately 6% to approximately 8% (w/w) of total cement. In certain embodiments, the cement additive is present in the cement in an amount of approximately 1%, approximately 2%, approximately 3%, approximately 4%, approximately 5%, approximately 6%, approximately 7%, approximately 8%, approximately 9% or approximately 10% (w/w). In a preferred embodiment, the cement additive is present in an amount of approximately 8% (w/w) of total cement. These levels of use of a cement additive of the invention may be suitable for use in cements comprising Portland cement clinker, for example.

In other embodiments, the cement additive is present in an amount of from approximately 10% to approximately 25% (w/w) of total cement. In certain embodiments, the cement additive is present in an amount of from approximately 10% to approximately 15% (for example approximately 11 or 12%), from approximately 15% to approximately 20% or from approximately 20% to approximately 25% (w/w). In other embodiments, the cement additive is present in an amount of greater than approximately 25% (w/w). In one embodiment, the cement additive may be present in an amount of up to approximately 45% (w/w).

The level of a cement additive of the invention present in a cement may be adjusted based on the desired level of sulfur trioxide in the final cement product, having regard to the sulfur content in the cement additive, the clinker and/or other ingredients to be included in the cement.

Higher levels (for example, from approximately 10 to approximately 25% (w/w)) of a cement additive of the invention may be suitable for use in cements utilising clinker having lower sulfur (typically expressed as sulfur trioxide) levels than standard Portland cement clinker or where a higher sulfur (typically expressed as sulfur trioxide) content is tolerated (such as in specialty cements such as CSA). By way of example, in one embodiment, a cement additive of the invention may be used at a level of up to approximately 12% (w/w) in a cement comprising Portland cement clinker having a relatively low sulfur trioxide level. In other embodiments, where the cement additive is used in a specialty cement such as CSA (which may traditionally comprise up to approximately 25% gypsum), the cement additive of the invention may be present in an amount of up to approximately 45% (w/w).

In one embodiment, the cement comprises clinker and a cement additive of the invention in an amount mentioned previously herein. In one embodiment, the cement comprises clinker and a cement additive of the invention in an amount from approximately 4% to approximately 8% (for example approximately 4%, approximately 6% or approximately 8%) of total cement w/w. In one embodiment, the cement is an ordinary Portland cement.

In one embodiment, a cement additive of the invention is able to replace up to approximately 3.5%, up to approximately 5% or up to approximately 7% of the clinker traditionally used in an ordinary Portland cement.

Any appropriate clinker may be used, and skilled persons will readily appreciate clinkers of use in the invention. However, by way of example a clinker of use in the invention may comprise one or a combination of two or more of calcium silicates such as alite, belite, tricalcium aluminate, and calcium aluminoferrite (brownmillerite). Clinker may be made from known sources, such as limestone in combination with clay, sand, iron ore, bauxite, fly ash and/or slag for example, using known methodology. Alternatively, one or a combination of readily available commercial clinkers may be used; by way of example, Gladstone clinker, as referred to in the Examples later in this document.

Skilled persons will readily appreciate premade cements which may be of use (eg. combined with a cement additive) in certain embodiments of the invention. Typically, premade cements will comprise at least clinker and gypsum. By way of non-limiting example, a cement may be chosen from the group comprising: hydraulic cement, Portland cement, GP cement, GB cement, GL cement, HE cement, LH cement, SL cement, SR cement. In certain embodiments a combination of two or more different cements may be used. Specialty cements may also be used.

Skilled persons will readily appreciate sources of additional gypsum which may be of used in the present invention, including those previously mentioned herein. However, in one embodiment, the invention provides the benefit of reducing, if not eliminating, the need to supply and add a separate source of gypsum.

Cements of the invention may also comprise additional ingredients which may be included for a desired purpose, including for example, decorative or aesthetic purposes, or to otherwise change the performance and/or one or more characteristic of the cement. For example, colouring agents and/or hydration control additives could be added to the cement. In one embodiment, one or more separate pozzolanic materials could be included in the cement. However, the inventors contemplate that use of the cement additive of the invention in a cement would reduce or eliminate the need to include such additional materials in the cement.

In one embodiment, cements of the invention will be capable of producing a hardened mortar (when mixed with an appropriate amount of water and allowed to set and harden) which for a GP cement has a compressive strength which at least complies with Australian Standard AS 3972-2010. In one embodiment, the cements are capable of producing a hardened mortar with a compressive strength of at least approximately 30 MPa at 7 days (for example, as per Australian Standard 2350.12 (formerly 2350.6). In one embodiment, the cements are capable of producing a hardened mortar with a compressive strength of at least approximately 35 MPa at 7 days. In one embodiment, the cements are capable of producing a hardened mortar with a compressive strength of at least approximately 40 MPa at 7 days. In certain embodiments, a hardened mortar made with a cement additive of the invention (for example, as a GP cement) has a compressive strength at 7 days of from approximately 30 MPa to approximately 42 MPa, for example approximately 30, approximately 31, approximately 32, approximately 33, approximately 34, approximately 35, approximately 36, approximately 37, approximately 38, approximately 39, approximately 40, approximately 41, or approximately 42 MPa. In another embodiment, the cements are capable of producing a hardened mortar with a compressive strength of at least approximately 45 MPa at 28 days (for example, as per Australian Standard 2350.12 (formerly 2350.6). In another embodiment, the cements are capable of producing a hardened mortar with a compressive strength of at least approximately 50 MPa at 28 days. In another embodiment, the cements are capable of producing a hardened mortar with a compressive strength of at least approximately 55 MPa at 28 days. In certain embodiments, a hardened mortar made with a cement additive of the invention (for example, as a GP cement) has a compressive strength at 28 days of approximately 45 MPa to approximately 58 MPa, for example approximately 45, approximately 46, approximately 47, approximately 48, approximately 49, approximately 50, approximately 51, approximately 52, approximately 53, approximately 54, approximately 55, approximately 56, approximately 57 or approximately 58 MPa.

Cements of the invention may be made by combining a cement additive as described herein with one or more other cement ingredients in a manner as would be readily understood by persons skilled in the art. However, by way of example, clinker, premade cement and/or gypsum may be combined with the cement additive (and optionally additional ingredients) in the desired amounts and mixed together.

In a preferred embodiment, clinker and cement additive are combined and mixed together. In one embodiment, the clinker is ground prior to combining with the cement additive. In a preferred embodiment, the clinker and cement additive are combined and interground.

In certain embodiments, the method further comprises the addition of one or more other ingredients as desired for a particular cement application.

Cementitious Products

The invention also provides cementitious products such as mortars, grouts, stuccos or concretes. These products will comprise (at least in their hydrated state) at least cement and water, or cement, aggregate and water, where the cement comprises a cement additive as described herein.

The cementitious products may comprise any amount of a cement according to the invention, as those of skill in the art will readily appreciate. Skilled persons can follow the general guidelines provided by cement manufactures and/or published industry standards, having regard to the nature of the cementitious product to be made. However, by way of example, they may comprise from approximately 1% to approximately 50% cement to total product mix (w/w). In certain embodiments, a cementitious product may comprise from approximately 5% to approximately 45%, approximately 10% to approximately 40%, approximately 15% to approximately 35%, or approximately 20% to approximately 30% to cement to total product mix (w/w). In certain embodiments, a cementitious product may comprise approximately 1%, approximately 5%, approximately 10%, approximately 15%, approximately 20%, approximately 25%, approximately 30%, approximately 35%, approximately 40%, approximately 45% or approximately 50% cement to total product mix (w/w).

The cementitious products may comprise any amount of aggregate, as those of skill in the art will readily appreciate. Skilled persons can follow the general guidelines provided by cement manufacturers and/or published industry standards, having regard to the nature of the cementitious product to be made. However, by way of example, a cementitious product may comprise from approximately 50% to approximately 90% aggregate to total product mix (w/w). In certain embodiments, a cementitious product may comprise from approximately 55% to approximately 85%, approximately 60% to approximately 80%, approximately 65% to approximately 75% aggregate to total product mix (w/w). In certain embodiments, a cementitious product may comprise approximately 50%, approximately 55%, approximately 60%, approximately 65%, approximately 70%, approximately 75%, approximately 80%, approximately 85%, or approximately 90% aggregate to total product mix (w/w).

The cementitious product may comprise any amount of water, as those of skill in the art will readily appreciate. Skilled persons can follow the general guidelines provided by cement manufacturers and/or published industry standards, having regard to the nature of the cementitious product to be made. However, by way of example, a cementitious product may comprise from approximately 2% to approximately 20% water to total product mix (w/w). In certain embodiments, a cementitious product may comprise from approximately 5% to approximately 15% water to total product mix (w/w). In certain embodiments, a cementitious product may comprise approximately 2%, approximately 5%, approximately 10%, approximately 15%, or approximately 20% water to total product mix (w/w). The % w/w of water to total product mix expressed in this paragraph is based on the total weight of the wet product mix.

Persons skilled in the art will readily appreciate the appropriate ratio of aggregate to cement to be used to prepare a cementitious product. Skilled persons can follow the general guidelines provided by cement manufacturers and/or published industry standards, having regard to the nature of the cementitious product to be made. However, by way of example, the ratio of total aggregate to total cement used in the product may be from approximately 1:1 to approximately 10:1. In certain embodiments, the ratio is approximately 1:1, approximately 2:1, approximately 3:1, approximately 4:1, approximately 5:1, approximately 6:1, approximately 7:1, approximately 8:1, approximately 9:1 or approximately 10:1.

Persons of skill in the art will also readily appreciate the appropriate ratio of water to cement to be used to prepare a cementitious product. Skilled persons can follow the general guidelines provided by cement manufacturers and/or published industry standards, having regard to the nature of the cementitious product to be made. However, by way of example, the ratio of water to cement in the wet product mix may be from approximately 0.4 to approximately 0.8. In certain embodiments, the ratio of water to cement in the wet mix may be approximately 0.4, approximately 0.5, approximately 0.6, approximately 0.7, or approximately 0.8.

The type of aggregate, if any, used in a cementitious product can vary depending on the desired aesthetic and functional needs of the final product (including for example whether it is to be a concrete, stucco, grout or a mortar) as skilled persons will understand. Skilled persons can follow the general guidelines provided by cement manufacturers and/or published industry standards, having regard to the nature of the cementitious product to be made. The aggregate may be of any appropriate size from those considered fine to those considered coarse. A combination of different sized aggregates may be used in any desired ratios. By way of example only, a coarse aggregate may be from approximately 4.75 mm and larger, for example 5 mm to approximately 40 mm in diameter and may include one or more different sizes. Examples of coarse aggregates include gravel and stone. By way of example only, a fine aggregate may be from approximately 0.075 mm to approximately 4.75 mm in diameter and may include one or more different sizes. Examples of fine aggregates include sand and crushed stone or gravel. By way of example, coarse aggregate will typically be used in concretes and fine aggregates may be used in mortars or in combination with coarse aggregate in concretes. Aggregates of use in the invention can be readily sourced commercially.

Cementitious products (for example, mortars, stuccos, grouts and concretes) of the invention may also comprise one or more additional ingredients as may be desired for a particular application including for example colouring agents, plasticizers, additional natural or synthetic pozzalans, and/or specialised admixtures.

Cementitious products of the invention may be made using conventional methods as will be understood by skilled persons. However, generally, the methods comprise at least the step of combining cement comprising a cement additive of the invention with water or with an aggregate (including reference to one or more aggregate) and water. The ingredients may be combined in any order. Once combined and mixed, the wet cementitious product may be worked (for example, poured, spread, placed, moulded and the like) as desired and then allowed to set and harden. Accordingly, the invention also provides cementitious articles comprising hardened cementitious products of the invention. Such articles may be anything capable of being made from one or more cementitious products including for example building materials such as bricks, pavers, tiles, blocks, panels, furniture such as chairs, tables and umbrella stands, and decorative items such as ornaments, sculptures, statues and plant pots.

EXAMPLES

Example 1

The following table provides XRF analysis of the composition of an exemplary cement additive of the invention. The sample was derived from a VTM slag (sourced from a steel mill in China which processes Panzhihua ore body located in the Sichuan region of China).

TABLE 1

| Sample C112 XRF results | | | |
|---|---|---|---|
| Mg | 0.634% | Mg as MgO | 1.051% |
| Al | 0.851% | Al as Al2O3 | 1.608% |
| Si | 11.014% | Si as SiO2 | 23.561% |
| Ca | 19.348% | Ca as CaSO4 | 65.729% |
| Ti | 2.518% | Ti as TiO2 | 4.200% |
| Mn | 0.028% | Mn as MnO | 0.036% |
| Fe | 0.149% | Fe as FeO | 0.192% |
| pH in 50% solution | 4.0-4.1 | | |

The compounds above are reported as oxides or sulphates. However, elements may at least partly exist in the form of unreacted minerals that were present in the feedstock.

The compound % compositions are calculated from the measured elemental % concentration using the following formula:

$$\frac{\% \text{ element measured}}{\text{atomic weight of element}} \times \text{molecular weight of assumed compound}$$

Sample C112 was prepared according to the following method.

Sulphation: Slag was dried but not ground, then 98% sulphuric acid was added to a reaction vessel at a ratio of 1.6× the mass of slag, the slag was then added and the mixture was combined and maintained under agitation. The temperature of the mixture was increased with external heating until the peak of the exotherm temperature of the reaction was reached and then held for 30 min.

Leach: The reacted material was then mixed with water in a ratio of 1:1 and held at 70° C. for 60 min, then the slurry was filtered to recover the solid fraction.

Washing: The solids were combined with water at a ratio of 5× the solids mass and agitated for 1.5 hrs then filtered. The solids were then combined again with 5× water and Ca(OH)2 was added until the pH was between 6-7, then held for 1.5 hrs before filtering. The solids were then dried at 70° C. for 12 hrs.

Example 2

The following table provides XRF analysis of the composition of an exemplary cement additive of the invention. The sample was derived from New Zealand Steel (131 Mission Bush Rd, Glenbrook 2681, New Zealand) Melter Slag.

TABLE 2

| Sample C110 XRF results | | | |
|---|---|---|---|
| Mg | 1.327% | Mg as MgO | 2.201% |
| Al | 2.101% | Al as Al2O3 | 3.970% |
| Si | 9.653% | Si as SiO2 | 20.649% |
| Ca | 17.609% | Ca as CaSO4 | 59.821% |
| Ti | 4.257% | Ti as TiO2 | 7.101% |
| Mn | 0.257% | Mn as MnO | 0.332% |
| Fe | 0.257% | Fe as FeO | 0.331% |
| pH in 50% solution | 4.5 | | |

The compounds above are reported as oxides or sulphates. However, elements may at least partly exist in the form of unreacted minerals that were present in the feedstock.

The compound % compositions are calculated from the measured elemental % concentration using the following formula:

$$\frac{\% \text{ element measured}}{\text{atomic weight of element}} \times \text{molecular weight of assumed compound}$$

C110 was prepared according to the following method.

Sulphation: Slag was ground, then 75% sulphuric acid was added to 5 L carbon steel reaction vessel at a ratio of 1.5× the mass of slag, the slag was then added and the mixture was combined and maintained under agitation with an overhead stirrer. The temperature of the mixture was increased with external heating until the peak of the exotherm temperature of the reaction was reached and then held for 2 hrs.

Leach: The reacted material was mixed with water in a ratio of 1:1 and held at 40° C. for 60 min, then the slurry was filtered to recover a solid fraction.

Washing: The solid fraction was combined with water at a ratio of 5× the solids mass and agitated for 1.5 hrs then filtered. The solids were then combined again with 5× water and Ca(OH)2 was added until the pH was between 6-7, then held for 1.5 hrs before filtering. The solids were then dried at 70° C. for 12 hrs.

Example 3

Trials were conducted on C110 as a gypsum substitute in GP cement. Trials were conducted at the Cement Australia Darra laboratory (Australia).

A sample of Gladstone clinker was ground in a laboratory ball mill to produce the cement for the trials. The cement produced contained no grinding aid, limestone or gypsum and was analysed prior to use in the laboratory trials. The results obtained are detailed in Tables 3 and 4 below.

Gladstone clinker was sourced from Cement Australia's Gladstone Cement plant in Gladstone, Queensland, Australia.

TABLE 3

Elemental composition of ground clinker

| Sample Identification | Ground Clinker |
|---|---|
| Laboratory ID | 19010874 |
| Analyte | |
| Loss on Ignition % | 0.7 |
| Calcium as % CaO | 65.8 |
| Silicon as % SiO2 | 22.0 |
| Aluminium as % Al2O3 | 5.3 |
| Iron as % Fe2O3 | 3.5 |
| Sulfur as % SO3 | 0.36 |
| Magnesium as % MgO | 1.0 |
| Potassium as % K2O | 0.55 |
| Sodium as % Na2O | 0.33 |
| Phosphorous as % P2O5 | 0.07 |
| Titanium as % TiO2 | 0.31 |
| Strontium as % SrO | 0.02 |

TABLE 4

Particle size distribution of ground clinker

| Particle Size μm | Cumulative % Passing |
|---|---|
| 212 | 96 |
| 128 | 96 |
| 90 | 93 |
| 64 | 87 |
| 48 | 80 |
| 45 | 78 |
| 32 | 68 |
| 24 | 60 |
| 16 | 50 |
| 12 | 44 |
| 8 | 35 |
| 6 | 29 |
| 4 | 20 |
| 3 | 15 |
| 2 | 8 |
| 1.5 | 5 |
| 1.0 | 3 |
| 0.8 | 2 |
| 0.6 | 1 |
| 3-32 | 53.6 |
| D10-μm | 2.2 |
| D90-μm | 73.0 |
| MMD μm | 16 |
| Fineness Index m2/kg | 380 |

The cement was blended, not interground, with either gypsum or the exemplary cement additive C110 of the invention prior to analysis at various dose rates to assess relative performance in terms of mortar setting and compressive strength. A control cement, the ground clinker without the addition of any source of sulfate, was run with each analysis.

Typical results for plant ground Gladstone clinker, using grinding aid plus limestone and gypsum were included for comparison. The paste tests were conducted as per published Australian Standards AS 2350.3, AS 2350.4 and 2350.5. The compressive strength of mortar was tested as per Australian Standard AS 2350.6.

Results

The results of the paste tests are presented in Table 5 and the compressive strength tests in Table 6.

TABLE 5

Results of paste testing

| | Normal consistency % | False set % | Flash set % | Initial set min[x] | Final set min[x] | Soundness mm |
|---|---|---|---|---|---|---|
| Control (clinker alone) | 31.5 | 5.9 | 115 | 195 | 251 | 3 |
| Control + 4.5% gypsum hemihydrate | 25.6 | 8.8 | 83 | 75 | 112 | 1 |
| Control + 4.5% gypsum dihydrate | 24.8 | 14.7 | 80 | 75 | 116 | 1 |
| Control + 4% C110 | 28.2 | 3.0 | 24 | 60 | 115 | 1 |
| Control + 6% C110 | 26.7 | 9.1 | 27 | 75 | 111 | 1 |
| Control + 8% C110 | 26.6 | 14.3 | 63 | 60 | 95 | 2 |
| Typical for GP* | 28 | 90 | — | 100 | 170 | 1 |

*Typical results for GP cement produced from this clinker
[x]Results rounded to the nearest 15 minutes

TABLE 6

Result of compressive strength testing

| | Compressive Strength MPa | | |
|---|---|---|---|
| | 3 Day | 7 Day | 28 Day |
| Control (clinker alone) | 25.4 | 30.0 | 44.1 |
| Control + 4.5% gypsum hemihydrate | 30.1 | 37.6 | 51.4 |
| Control + 4.5% gypsum dihydrate | 30.6 | 38.1 | 54.1 |
| Control + 4% CalSil | 28.6 | 33.0 | 47.0 |
| Control + 6% CalSil | 29.7 | 38.6 | 52.9 |
| Control + 8% CalSil | 30.8 | 39.0 | 53.2 |

Normal Consistency

The results indicate that at dose rates of 6% and above the cement additive C110 has a positive influence on the normal consistency.

Setting Times

The results indicate that at dose rates of 4% and above the C110 cement additive has a positive influence on the setting times. AS3972 notes setting times for a GP cement should be within the range of 45 minutes to 6 hours. Generally, the quicker the setting time the better. The results for the C110 containing samples are equivalent to or better than the control samples containing gypsum.

At dose rates less than 8% the results indicate a tendency for the mixes to flash set. However, flash setting characteristics are likely to be influenced by a lack of intergrinding of the sulfate sources (gypsum or C110). No conclusions can be drawn from the false setting results. The lack of intergrinding has resulted in all mixes false setting however cement produced in plant from this clinker shows no propensity to false set. It is expected that inter-grinding will address any false setting issues.

Soundness

Soundness is a measure of a cement's expansive nature of the hardened cement paste and in accordance with AS 3972, General Purpose and Blended Cements, the cement must have soundness of 5% or less to be classified as a Type GP, GL, GB, HE, LH, SR or SL cement. The cement produced by blending ground clinker with C110 in the proportions indicated had a soundness <5%. This indicates the cement produced would meet soundness requirements and at least from a soundness perspective could be classified as a Type GP, GL, GB, HE, LH, SR or SL cement.

Compressive Strengths

The results indicate that as the level of C110 in the test sample increases, the compressive strength increases. In other words, the strength of the samples is increasing as the clinker level decreases. Particularly at dose rates of 6% and above the C110 sample has a positive influence on the mortar strengths with a similar level of performance to the gypsum dosed mixes. These results were not anticipated and indicate that a cement additive of the invention can act as a substitute, at least partially, for clinker in cement products.

Example 4

Mortar compressive strength tests were conducted on sample C110. Sample C110 was prepared as described in Example 2. The mortar compressive strength tests were conducted at Holcim NZ Laboratory, New Zealand using the methods described in AS/NZS2350.11 (Methods of Testing Portland, Blended and Masonry Cements. Compressive Strength) and AS/NZS2350.12 (Methods of Testing Portland, Blended and Masonry Cements. Preparation of a Standard Mortar and Moulding of Specimens).

Results

Table 7 shows the mortar compressive strength results for natural gypsum and a cement additive of the invention. The results show that as the amount of the cement additive increases so does compressive strength. At an 8% addition rate of the test cement additive, a higher compressive strength is achieved at 28 days compared to the sample containing natural gypsum at 4.5%.

TABLE 7

Mortar test results

| Lab ID | | X19-090 | X19-091 | X19-092 | X19-093 |
|---|---|---|---|---|---|
| Gypsum | | Natural | Test sample | | |
| Addition rate (%) | | 4.5 | 4.0 | 6.0 | 8.0 |
| Mortar | 3 day (MPa) | 34.0 | 28.6 | 30.4 | 33.5 |
| compressive | 7 day (MPa) | 42.0 | 32.2 | 37.7 | 42.0 |
| strength | 28 day (MPa) | 54.4 | 49.2 | 50.8 | 57.8 |

Example 5

Trials were conducted on C112 as a gypsum substitute in GP cement. Trials were conducted at the Cement Australia Darra laboratory (Australia). Gladstone clinker and test samples were prepared and tested as described in example 3 above, with the exception that test cement additive C112 (as per example 1) was used instead of C110. Control sample #1 comprised the ground clinker without the addition of any source of sulfate.

Results

The results of paste properties and compressive strength tests are provided in Table 8 and Table 8A.

TABLE 8

Result of paste properties

| | Paste properties | | | | | |
|---|---|---|---|---|---|---|
| Sample description | Normal consistency % | False set % | Flash set % | Setting time (min)$^x$ | | Soundness (mm) |
| | | | | Initial | Final | |
| Control #1 | 30.7 | 11.4 | 106 | 195 | 255 | 2 |
| Test sample 4% | 25.7 | 25.7 | 97 | 60 | 105 | 2 |
| Test sample 6% | 25.7 | 34.3 | 97 | 60 | 105 | 1 |
| Test sample 8% | 25.8 | 22.9 | 97 | 75 | 120 | 1 |
| Typical for GP* | 28 | 90 | — | 100 | 170 | 1 |

*Typical results for GP cement produced from this clinker
$^x$Results rounded to the nearest 15 minutes

TABLE 8A

Compressive strength testing

| Sample description | Mortar Strength (MPa) | | |
|---|---|---|---|
| | 3 day | 7 day | 28 day |
| Control | 27.5 | 34.0 | 43.9 |
| Test sample 4% | 28.2 | 36.6 | 52.9 |
| Test sample 6% | 31.5 | 38.2 | 51.1 |
| Test sample 8% | 31.8 | 40.2 | 51.6 |

Normal Consistency

The results indicate that at dose rates 4% and above the C112 cement additive has a positive influence on normal consistency.

Setting Times

The results indicate that at a dose rate of 4% and above the C112 cement additive has a positive influence on the setting times. Flash setting is not an issue. While the false setting results may initially appear to be of concern, this is believed to be artefact of the methods used to prepare the samples. As noted in Example 3, the lack of inter-grinding has resulted in all control mixes false setting however cement produced in plant from the same clinker shows no propensity to false set. It is expected that inter-grinding will address any false setting issues.

Soundness

As mentioned in Example 3, soundness is a measure of a cement's expansive nature of the hardened cement paste. In accordance with AS 3972 cements must have a soundness of 5% or less to be classified as a Type GP, GL, GB, HE, LH, SR or SL cement. The cement produced by blending ground clinker with C112 in the proportions indicated had a soundness <5%. This indicates the cement produced would meet soundness requirements and at least from a soundness perspective could be classified as a Type GP, GL, GB, HE, LH, SR or SL cement.

Mortar Strength

The results indicate that the C112 cement additive has a positive influence on mortar strength. As the level of C112 in the test sample increases, the compressive strength increases. In other words, the strength of the samples is increasing as the clinker level decreases. These results were not anticipated and indicate that a cement additive of the invention can act as a substitute, at least partially, for clinker in cement products.

Example 6

The following table provides XRF analysis of the composition of another exemplary cement additive (P180) of the invention. The sample was derived from New Zealand Steel Melter Slag.

TABLE 9

XRF results for P180-43

| Mg | 1.450% | Mg as MgO | 2.404% |
|---|---|---|---|
| Al | 1.562% | Al as $Al_2O_3$ | 2.951% |
| Si | 10.714% | Si as $SiO_2$ | 22.919% |
| Ca | 18.002% | Ca as $CaSO_4$ | 61.149% |
| Ti | 1.622% | Ti as $TiO_2$ | 2.707% |
| Mn | 0.163% | Mn as MnO | 0.210% |
| Fe | 0.161% | Fe as FeO | 0.207% |
| pH in 50% solution | 3.6 | | |

The compounds above are reported as oxides or sulphates. However, elements may at least partly exist in the form of unreacted minerals that were present in the feedstock.

The compound % compositions are calculated from the measured elemental % concentration using the following formula:

$$\frac{\% \text{ element measured}}{\text{atomic weight of element}} \times \text{molecular weight of assumed compound}$$

P180 was prepared using the following methodology.

Sulphation: Slag was ground, then 89% sulphuric acid was then added to 5 L reaction vessel at a ratio of 10× the mass of slag, the slag was then added and the mixture was combined and maintained under agitation. The temperature of the mixture was increased to 200° C. at 2° C./min with external heating and held for 2 rs. The slurry was then filtered and solids retained.

Leach: The reacted solids were then mixed with water in a ratio of 1:1.5 and held at 70° C. for 30 min, then the slurry was filtered to recover the solid fraction.

Washing: The solids were combined with water at a ratio of 2× the solids mass and agitated then NaOH was added until the pH was between 6-7, then held for 1 hr before filtering. The solids were then dried at 130° C. for 12 hrs.

Example 7

The following table provides XRF analysis of the composition of other exemplary cement additives of the invention. Samples derived from steel mill slag as described in China and New Zealand as described in Examples 1 and 2.

TABLE 10

XRF results for cement additive samples

| | NZS | | | | China | | |
|---|---|---|---|---|---|---|---|
| Elements | % | Compounds | % | Elements | % | Compounds | % |
| Mg | 4.256 | Mg as MgO | 7.058 | Mg | 3.568 | Mg as MgO | 5.917 |
| Al | 4.799 | Al as $Al_2O_3$ | 9.068 | Al | 3.758 | Al as $Al_2O_3$ | 7.101 |
| Si | 10.19 | Si as $SiO_2$ | 21.798 | Si | 7.472 | Si as $SiO_2$ | 15.984 |
| Ca | 16.224 | Ca as $CaSO_4$ | 55.111 | Ca | 13.794 | Ca as $CaSO_4$ | 46.857 |
| Ti | 8.946 | Ti as $TiO_2$ | 14.926 | Ti | 6.981 | Ti as $TiO_2$ | 11.648 |
| Mn | 0.321 | Mn as MnO | 0.414 | Mn | 0.246 | Mn as MnO | 0.318 |
| Fe | 0.386 | Fe as FeO | 0.497 | Fe | 0.327 | Fe as FeO | 0.421 |

The compounds above are reported as oxides or sulphates. However, elements may at least partly exist in the form of unreacted minerals that were present in the feedstock.

The compound % compositions are calculated from the measured elemental % concentration using the following formula:

$$\frac{\% \text{ element measured}}{\text{atomic weight of element}} \times \text{molecular weight of assumed compound}$$

The samples were prepared using ammonium bisulfate as the sulphating agent.

Example 8

Samples C110 and C112 were analysed by isothermal calorimetry to ascertain the extent of pozzolanic reactivity exhibited by these materials. The analysis was conducted using an R3 test procedure (rapid, reproducible and relevant), which determines the pozzolanic activity of a supplementary material by measuring the heat of reaction in a standard mixture maintained at 40° C. over three days.

Heat release results were 105 J/g for C110 and 88 J/g for C112. The results indicate that both materials display pozzolanic activity.

Example 9

The following tables provides XRF analysis of the composition of other exemplary cement additives (C116, C117, C118 and C119) of the invention.

| Sample C116 XRF and pH results | | | |
|---|---|---|---|
| Mg | 0.57 | Mg as MgO | 1.0 |
| Al | 0.74 | Al as $Al_2O_3$ | 1.4 |
| Si | 10.42 | Si as $SiO_2$ | 22.3 |
| Ca | 20.38 | Ca as $CaSO_4$ | 69.3 |
| Ti | 1.55 | Ti as $TiO_2$ | 2.6 |
| Mn | 0.08 | Mn as MnO | 0.1 |
| Fe | 0.08 | Fe as FeO | 0.1 |
| pH in 50% solution | 4.3 | | |

| Sample C117 XRF and pH results | | | |
|---|---|---|---|
| Mg | 2.63 | Mg as MgO | 4.4 |
| Al | 2.82 | Al as $Al_2O_3$ | 5.3 |
| Si | 8.59 | Si as $SiO_2$ | 18.4 |
| Ca | 18.58 | Ca as $CaSO_4$ | 63.2 |
| Ti | 3.86 | Ti as $TiO_2$ | 6.4 |
| Mn | 0.33 | Mn as MnO | 0.4 |
| Fe | 0.34 | Fe as FeO | 0.4 |
| pH in 50% solution | 7.92 | | |

| Sample C118 XRF and pH results | | | |
|---|---|---|---|
| Mg | 0.55 | Mg as MgO | 0.9 |
| Al | 0.64 | Al as $Al_2O_3$ | 1.2 |
| Si | 10.39 | Si as $SiO_2$ | 22.3 |
| Ca | 20.51 | Ca as $CaSO_4$ | 69.7 |
| Ti | 1.15 | Ti as $TiO_2$ | 1.9 |
| Mn | 0.12 | Mn as MnO | 0.1 |
| Fe | 0.07 | Fe as FeO | 0.1 |
| pH in 50% solution | 7.3 | | |

| Sample C119 XRF and pH results | | | |
|---|---|---|---|
| Mg | 3.91 | Mg as MgO | 6.5 |
| Al | 4.32 | Al as $Al_2O_3$ | 8.2 |
| Si | 7.08 | Si as $SiO_2$ | 15.2 |
| Ca | 14.98 | Ca as $CaSO_4$ | 50.9 |
| Ti | 5.77 | Ti as $TiO_2$ | 9.6 |
| Mn | 0.31 | Mn as MnO | 0.4 |
| Fe | 0.73 | Fe as FeO | 0.9 |
| pH in 50% solution | 7.14 | | |

The compounds above are reported as oxides or sulphates. However, elements may at least partly exist in the form of unreacted minerals (e.g. metal silicate complexes, perovskite) that were present in the slag feedstock.

The compound % compositions are calculated from the measured elemental % concentration using the following formula:

$$\frac{\% \text{ element measured}}{\text{atomic weight of element}} \times \text{molecular weight of assumed compound}$$

Materials C116 and C118 were derived from a VTM slag (sourced from a steel mill in China which processes Panzhihua ore body located in the Sichuan region of China). Materials C117 and C119 were derived from New Zealand Steel (131 Mission Bush Rd, Glenbrook 2681, New Zealand) Melter Slag. Materials were prepared using the following methodology:

Sulphation: Slag was dried and ground to the required grind size, then <90% concentration sulfuric acid was added to a reaction vessel at a ratio of ~1.5× the mass of slag. The slag was then added, and the mixture was combined and maintained under agitation. The temperature of the mixture was increased with external heating until the peak of the exotherm temperature of the reaction was reached and then held for 60 min.

Leach: The reacted material was then mixed with water in a ratio of 1:1 and held at 70° C. for 60 min, then the slurry was filtered to recover the solid fraction.

Washing: The solids were combined with water at a ratio of 5× the solid mass and agitated for 1.5 hrs, then filtered. The solids were then combined again with 5× water and Ca(OH)2 was added until the slurry pH was between 5-8, then held for 1.5 hrs before filtering. The solids were then dried at 70° C. overnight.

Example 10

Four samples (C116, C117, C118 and C119) were analysed by isothermal calorimetry to ascertain the extent of pozzolanic reactivity exhibited by these materials. The analysis was conducted using an R3 test procedure (rapid, reproducible and relevant), which determines the pozzolanic activity of a supplementary material by measuring the heat of reaction in a standard mixture maintained at 40° C. over three days. The results are shown in Table 11 below with some typical heat release results for other supplementary materials. A low reactivity fly ash is considered to be one with an accelerated 7 day strength index as per AS 3583.6 of approximately 90% while a medium reactivity fly ash would have a strength index of approximately 100%.

TABLE 11

Summary of $R^3$ Test Results

| Test Material | Heat Release J/g |
|---|---|
| C116-43-1 | 137 |
| C117-43-5 | 115 |
| C118-43-1 | 155 |
| C119-43-1 | 122 |
| Low Reactivity Fly Ash | 85-95 |
| Medium Reactivity Fly Ash | 100-120 |
| High Reactivity Fly Ash | 130-180 |
| Ground granulated blast furnace slag | 375-400 |
| Gypsum | 6 |

The results show that all four materials display pozzolanic activity and would be ranked similar to a medium to high reactivity fly ash.

Example 11

The following table provides another example of the composition of a cement additive of the invention.

| Chemical formula | CaSO4* + silicates | |
|---|---|---|
| Particle size | D50 > 20 micron | |
| Purity | >66% CaSO4.2H20 | |
| Analysis | CaSO4.2H20 | 66.7% |
| | SiO2 | 23.4% |
| | Al2O3 | 1.4% |
| | TiO2 | 4.0% |
| | MgO | 1.1% |
| | CaO | 3.1% |
| | FeO | 0.3% |
| | Free moisture | ≤20% |
| Trace elements | Cl | ND |
| | Mn | ND |
| | As | ND |
| | Pb | ND |
| | Cr | ND |

ND—not detected
*range of hydration states

Example 12

The following table provides another example of the composition of a cement additive of the invention.

| Chemical formula | CaSO4* + silicates | |
|---|---|---|
| Particle size | D50 > 20 micron | |
| Purity | >60% CaSO4 | |
| Analysis | CaSO4 | 61.5% |
| | SiO2 | 20.3% |
| | Al2O3 | 3.9% |
| | TiO2 | 4.4% |
| | MgO | 1.5% |
| | CaO | 4.3% |
| | FeO | 1.6% |
| | Free moisture | ≤20% |
| Trace elements | Cl | ND |
| | Mn | ND |
| | As | ND |
| | Pb | ND |
| | Cr | ND |

ND—not detected
*range of hydration states

Example 13

Examples of constituents contained in titanium-bearing materials of use in the invention are provided in the table below. This provides details of the constituents of melter slag samples produced in New Zealand and South Africa and blast furnace slags produced in China and Russia. The Chinese slags were sourced from steel mills in China which process Panzhihua ore body located in the Sichuan region. It also details constituents of a perovskite-containing VTM ore concentrate samples obtained from Brazil. Values were calculated from elemental mass % data obtained using the X-ray fluorescence analytical technique.

The compound % compositions are calculated from the measured elemental % concentration using the following formula:

$$\frac{\% \text{ element measured}}{\text{atomic weight of element}} \times \text{molecular weight of assumed compound}$$

| Calculated from elemental mass % | China 1 | China 2 | Russia | South Africa | NZ | China 3 | China 4 | Brazil |
|---|---|---|---|---|---|---|---|---|
| CaO % | 37.36 | 29.80 | 34.00 | 18.89 | 17.77 | 28.68 | 31.62 | 16.1-20.91 |
| $TiO_2$ % | 7.96 | 20.19 | 9.64 | 33.37 | 32.87 | 21.02 | 17.19 | 16.67-26.27 |
| $SiO_2$ % | 27.81 | 22.89 | 27.17 | 19.66 | 14.35 | 24.39 | 23.74 | 13.6-33.3 |
| MgO % | 7.99 | 7.91 | 12.01 | 8.56 | 12.45 | 7.50 | 8.04 | 2.30-2.84 |
| $Al_2O_3$ % | 12.32 | 13.43 | 12.68 | 13.42 | 15.31 | 12.45 | 11.62 | 5.72-7.41 |
| $Fe_2O_3$ % | 1.15 | 1.94 | 0.99 | 3.35 | 4.60 | 1.73 | 2.97 | 2.29-9.58 |
| $V_2O_5$ % | 0.13 | 0.37 | 0.28 | 0.71 | 0.32 | 0.30 | 0.23 | 0.21-0.32 |
| Ratio $TiO_2$/CaO | 0.21 | 0.68 | 0.28 | 1.77 | 1.85 | 0.73 | 0.54 | 1.03-1.31 |
| Ratio of $TiO_2$/MgO | 1.00 | 2.55 | 0.80 | 3.90 | 2.64 | 2.80 | 2.14 | 7.24-9.40 |
| Ratio of $TiO_2$/$Al_2O_3$ | 0.65 | 1.50 | 0.76 | 2.49 | 2.15 | 1.69 | 1.48 | 2.25-4.45 |

*Assumed compounds present reported. Metals could be present in one or more other oxide form.

CONCLUSION

The results provided in the above Examples indicate that a cement additive of the invention can act as a substitute, at least partially, for clinker and/or gypsum in cement products, with the resulting cement product performing as well or surprisingly better than standard cement products. This has the advantage of reducing the cost and/or environmental impact of cement manufacture without compromising on cement quality.

The invention has been described herein with reference to certain preferred embodiments, in order to enable the reader to practice the invention without undue experimentation. Those skilled in the art will appreciate that the invention can be practiced in a large number of variations and modifications other than those specifically described. It is to be understood that the invention includes all such variations and modifications. Furthermore, titles, headings, or the like are provided to aid the reader's comprehension of this document and should not be read as limiting the scope of the present invention.

The entire disclosures of all applications, patents and publications cited herein are herein incorporated by reference. However, the reference to any prior art in this specification is not, and should not be taken as, an acknowledgement or any form of suggestion that that prior art forms part of the common general knowledge in the field of endeavour in any country.

The invention claimed is:

1. A method of making a cement additive that has pozzolanic activity, comprising:
   sulphating a vanadium titano-magnetite (VTM) slag comprising perovskite and silica with sulphuric acid to form a sulfated material, wherein the sulphuric acid concentration is greater than 80%, and wherein the sulphation reaction is conducted at a temperature from approximately 130 degrees C. to approximately 250 degrees C.; and
   separating a first composition comprising calcium sulfate and silica from one or more other components contained in the sulfated material, and wherein the VTM slag comprises percent by mass from approximately 15% to approximately 55% titanium dioxide, approximately 15% to approximately 40% calcium oxide, approximately 1% to approximately 25% silica, approximately 2% to approximately 15% magnesium oxide, approximately 5% to approximately 20% aluminium oxide, approximately 0% to approximately 10% iron oxide, and approximately 0% to approximately 2% vanadium oxide, and
   wherein the cement additive comprises from approximately 40% to approximately 80% calcium sulfate and from approximately 10% to approximately 50% silica, and has pozzolanic activity.

2. The method of claim 1, further comprising:
   combining the first composition comprising calcium sulfate and silica with water and at least one compound to adjust pH to from approximately 4 to approximately 9; and
   separating solids and liquids to obtain a second composition comprising calcium sulfate and silica.

3. The method of claim 2, wherein the at least one compound to adjust pH is chosen from calcium hydroxide and calcium oxide.

4. The method of claim 1, further comprising:
   combining the first composition comprising calcium sulfate and silica with water;
   separating solids and liquids to obtain a second composition;
   combining the second composition with water and at least one compound to adjust pH to from approximately 4 to approximately 9; and
   separating solids and liquids from the combined second composition and water to obtain a third composition comprising calcium sulfate and silica.

5. The method of claim 4, further comprising drying the first, second or third composition comprising calcium sulfate and silica.

6. The method of claim 4, further comprising combining the first composition, the second composition, or the third composition with one or more additional materials comprising a composition obtained in a process for a recovery of one or more metals from a material comprising perovskite and silica and/or a feedstock used in a method for the recovering of one or more metals or a derivative thereof.

7. The method of claim 1, wherein the sulphation reaction time is from approximately 15 minutes to approximately 45 minutes.

8. The method of claim 1, wherein the VTM slag comprising perovskite and silica has an average particle size from approximately 150 microns to approximately 250 microns.

9. The method of claim 1, wherein the ratio of sulfuric acid to the VTM slag comprising perovskite and silica used in the sulfation reaction is from approximately 0.75:1 to approximately 2:1.

10. The method of claim 1, wherein the pozzolanic activity of the cement additive produced is at least approximately 80 J/g.

11. A method for producing a cementitious product, comprising combining a cement produced by the method of claim 10 with a) water or b) an aggregate and water.

12. A method for producing cement, comprising combining a cement additive produced by the method of claim 1 with clinker.

13. The method of claim 12, wherein the cement additive displaces or replaces other sources of gypsum.

14. The method of claim 12, wherein the cement additive also partially displaces clinker.

* * * * *